US012620927B1

(12) United States Patent
    Karthikeyan

(10) Patent No.: US 12,620,927 B1
(45) Date of Patent: May 5, 2026

(54) MOUNTING SYSTEM FOR REPLACEMENT TILE(S) AND PHOTOVOLTAIC MODULE(S)

(71) Applicant: Unirac, Inc., Albuquerque, NM (US)

(72) Inventor: Vignesh Karthikeyan, Rai Durg (IN)

(73) Assignee: Unirac, Inc., Albuquerque, NM (US)

( * ) Notice: Subject to any disclaimer, the term of this patent is extended or adjusted under 35 U.S.C. 154(b) by 207 days.

(21) Appl. No.: 18/238,950

(22) Filed: Aug. 28, 2023

(51) Int. Cl.
    *H02S 20/25* (2014.01)

(52) U.S. Cl.
    CPC ................................... *H02S 20/25* (2014.12)

(58) Field of Classification Search
    CPC .......... H02S 20/25; H02S 20/30; H02S 20/23; H02S 20/24; H02S 20/10
    USPC ................................ 248/200, 223.41–224.61
    See application file for complete search history.

(56) References Cited

U.S. PATENT DOCUMENTS

| | | | | |
|---|---|---|---|---|
| 2,714,037 | A * | 7/1955 | Singer ................... | B05B 1/3033 |
| | | | | 239/533.1 |
| 3,610,687 | A * | 10/1971 | Barker ..................... | A47C 3/18 |
| | | | | 108/150 |
| 6,279,864 | B1 * | 8/2001 | Carnahan ................. | A47C 3/30 |
| | | | | 297/344.19 |
| 11,695,369 | B1 * | 7/2023 | Affentranger, Jr. ..... | H02S 20/20 |
| | | | | 52/173.3 |
| 2013/0340358 | A1 * | 12/2013 | Danning ............... | F24S 25/636 |
| | | | | 52/698 |
| 2013/0340811 | A1 * | 12/2013 | Danning ................. | F24S 25/67 |
| | | | | 136/251 |
| 2017/0310275 | A1 * | 10/2017 | Owen .................... | F24S 25/636 |
| 2019/0068110 | A1 * | 2/2019 | McPheeters ........... | F24S 25/70 |
| 2020/0309184 | A1 * | 10/2020 | Schuit .................... | F24S 25/30 |
| 2024/0022205 | A1 * | 1/2024 | Affentranger, Jr. ..... | H02S 20/23 |
| 2024/0060325 | A1 * | 2/2024 | Ding ........................ | F16B 9/02 |

* cited by examiner

*Primary Examiner* — Christopher Garft
(74) *Attorney, Agent, or Firm* — Lee & Hayes, P.C.

(57) ABSTRACT

A mounting system includes a base, a post coupled to the base, a stanchion having a passageway that rotatably couples about the post, a locking mechanism removably coupled to the base and configured to engage with the stanchion to prevent rotation of the stanchion, a cap having an opening, and a fastener disposed through the opening and into the passageway.

20 Claims, 26 Drawing Sheets

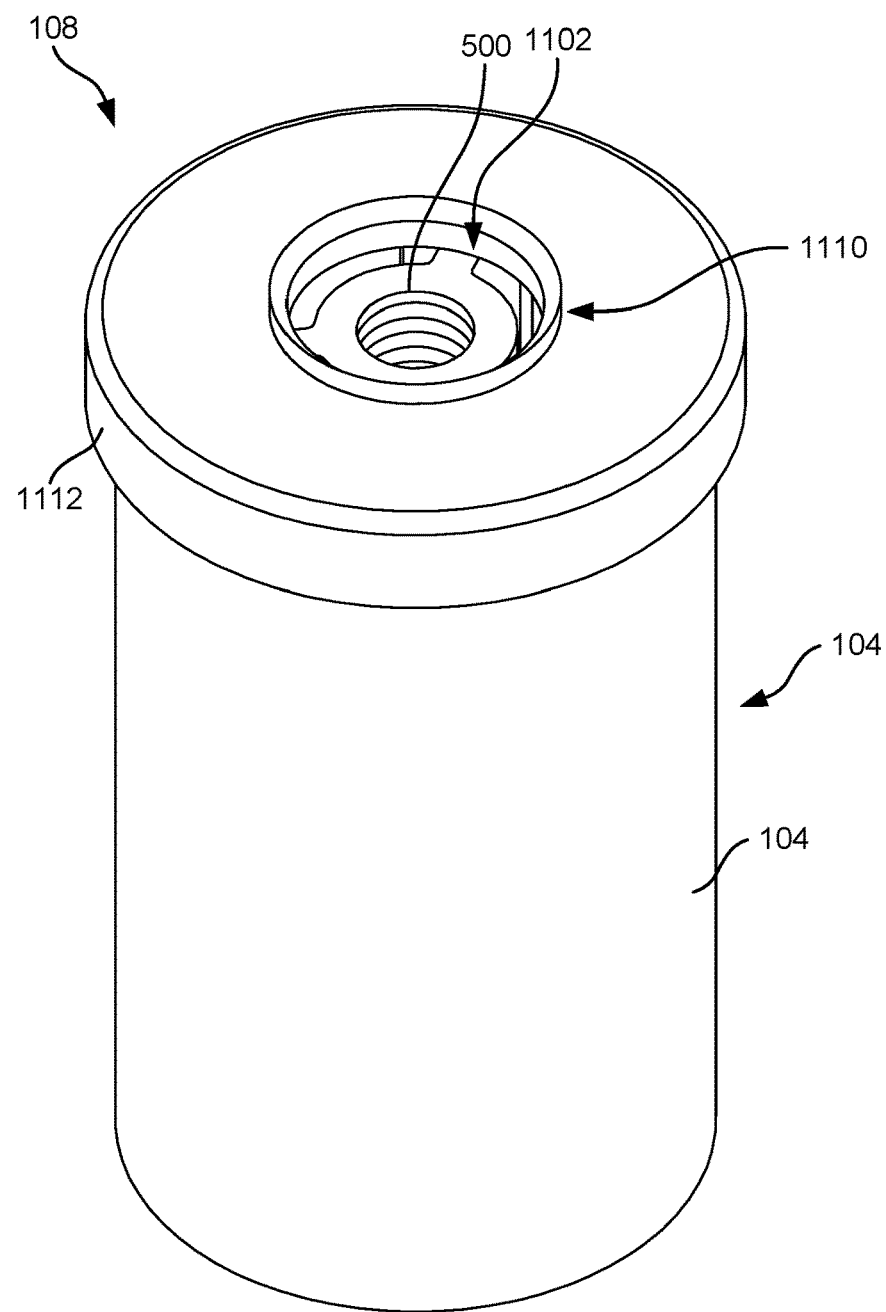
108
500 1102
1110
1112
104
104
FIG. 12
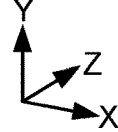

1700

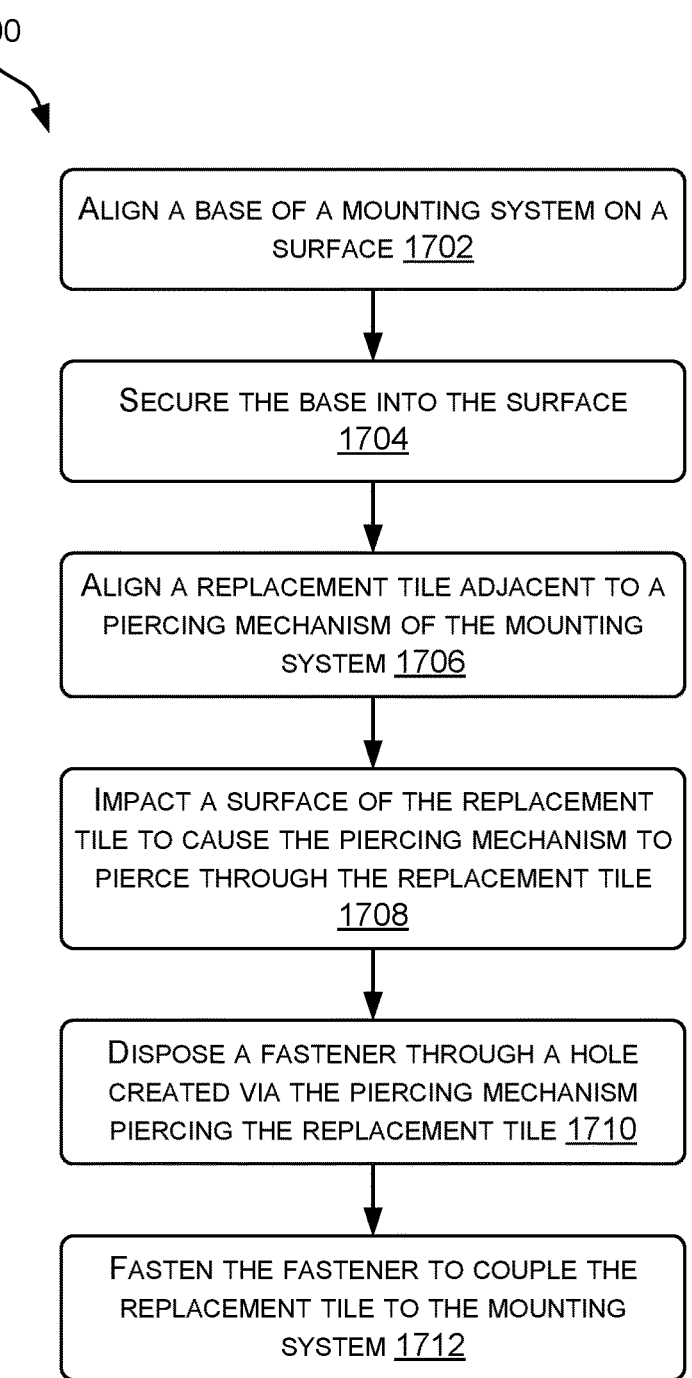

ALIGN A BASE OF A MOUNTING SYSTEM ON A SURFACE 1702

SECURE THE BASE INTO THE SURFACE 1704

ALIGN A REPLACEMENT TILE ADJACENT TO A PIERCING MECHANISM OF THE MOUNTING SYSTEM 1706

IMPACT A SURFACE OF THE REPLACEMENT TILE TO CAUSE THE PIERCING MECHANISM TO PIERCE THROUGH THE REPLACEMENT TILE 1708

DISPOSE A FASTENER THROUGH A HOLE CREATED VIA THE PIERCING MECHANISM PIERCING THE REPLACEMENT TILE 1710

FASTEN THE FASTENER TO COUPLE THE REPLACEMENT TILE TO THE MOUNTING SYSTEM 1712

FIG. 17

MOUNTING SYSTEM FOR REPLACEMENT TILE(S) AND PHOTOVOLTAIC MODULE(S)

BACKGROUND

The solar industry is growing world-wide and, as a result, more-efficient structures are desirable for mounting photovoltaic modules or solar panel modules to a structure, such as a roof of a home or other building. Whereas many different structures are known, there is a desire to reduce the complexity of such structures and improve the efficiency of such structures. Therefore, there is a need for an improved apparatus for mounting solar panel modules.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The components, devices, and/or apparatuses depicted in the accompanying figures are not to scale and components within the figures may be depicted not to scale with each other.

FIG. 1 illustrates a perspective view of an example mounting system usable with photovoltaic modules, according to embodiments of the present disclosure.

FIG. 5 illustrates a cross-sectional view of the mounting system of FIG. 1, taken along line A-A of FIG. 3B, according to embodiments of the present disclosure.

FIG. 12 illustrates the cap of FIGS. 11A and 11B disposed atop the stanchion of FIGS. 9A and 9B, according to embodiments of the present disclosure.

FIG. 17 illustrates an example method for installing a replacement tile, according to embodiments of the present disclosure.

DETAILED DESCRIPTION

Figure 2A:
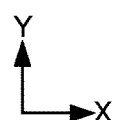
FIG. 2A illustrates a first side view of the mounting system of FIG. 1, according to embodiments of the present disclosure.

This application is directed, at least in part, to a mounting system having a variably adjusted height for accommodating a replacement tile on a structure, such as a roof, in which photovoltaic modules are installed. The structure, for example, may include a tile roof and to install the photovoltaic modules on the structure, some of the tiles may be removed. With the tile removed, the mounting system may mount to the structure (e.g., sheathing, studs, decking, etc.) and the replacement tile may be mounted to the mounting system. The replacement tile may be secured to the mounting system, and additional supports that accommodate the photovoltaic modules may be coupled to the mounting system. For example, a system of rails, frames, and so forth may couple to the mounting system, and the photovoltaic modules may couple to the rails. The mounting system may be adjustable in height to accommodate different sized and shaped tile roofs such that an existing roof of the structure is not compromised.

In an embodiment, the mounting system may include a base, a stanchion, a post, a cap, a locking mechanism, and a bracket. The base may couple to the structure, for example, via fasteners disposed through one or more openings, slots, or holes in the base. In an embodiment, the holes of the base may be staggered (e.g., along a zig-zag line, spaced apart in one or more direction from one another, offset, etc.) to increase or permit the fasteners to be fastened into stud(s) of the structure, or to avoid multiple fasteners falling into a seam in the sheathing (e.g., when being secured to the sheathing). The base also defines a receptacle that receives the stanchion, which is configured to be disposed by varying lengths from the base (or out of the receptacle).

In an embodiment, the post may couple to the base, and the stanchion may be rotatably coupled to the base about the post. For example, the post may include threads onto which the stanchion, which includes a threaded passageway, is fastened. The stanchion may be rotated in a first direction (e.g., counterclockwise) to extend from the base (e.g., unscrew from the post), and may be rotated in a second direction (e.g., clockwise) to retract into the base (e.g., screw onto the post). In other words, rotation of the stanchion in the first direction may result in the stanchion further extending from the base, so as to accommodate higher roof surfaces, while rotation of the stanchion in the second direction may result in the stanchion retracting into the base, so as to accommodate lower roof surfaces. In an embodiment, the stanchion may include a range of travel on the post to accommodate the different roofs.

The stanchion may include a groove that is engageable by the locking mechanism. In an embodiment, the groove may be disposed along a longitudinal length of the stanchion, and the locking mechanism may be engageable with the groove at different locations along the longitudinal length. The locking mechanism serves to lock the stanchion into position, once a desired height of the stanchion is achieved, to prevent further rotation, reorientation, or shifting of the stanchion. For example, once the stanchion is rotated (e.g., either in the first direction or the second direction) to a desired position, the locking mechanism may engage with the groove to prevent further rotation of the stanchion (e.g., either in the first direction or the second direction). In effect, this locks the position of the stanchion to prevent unwanted movement of the stanchion.

In an embodiment, the locking mechanism may represent a clip, slide, fastener, etc. that engages with the groove. In an embodiment, the locking mechanism may engage with the base. For example, the locking mechanism may clip into or onto the base to secure the locking mechanism to the base. In an embodiment, the locking mechanism may include flanges, tabs, etc. that are biased to engage with the base. The flanges, however, may be biased to remove the locking mechanism from the base. Accordingly, the locking mechanism may engage with the base to secure the locking mechanism in place and to prevent rotation of the stanchion.

The cap may couple to the stanchion and include a collar (e.g., ring, band, brim, etc.) that cuts, deforms, indents, or otherwise pierces the replacement tile. For example, the collar may include a leading or cutting edge that is configured to pierce through the replacement tile. In an embodiment, the collar pierces through the replacement tile to form a hole, aperture, etc. in which a fastener is received for coupling the replacement tile to the stanchion. In an embodiment, the cap couples to or sits atop the stanchion at an end opposite at which the stanchion threads onto the post.

The cap further includes an aperture that provides access to the threaded passageway of the stanchion, in order to receive a fastener that secures the replacement tile and/or the bracket. When installing the replacement tile, for example, a hole may need to be drilled through the replacement tile that aligns with the threaded passageway of the stanchion in order to accommodate the fastener that couples the replacement tile to the mounting system. However, the location of the hole that needs to be drilled may be dependent upon the mounting location of the base to the structure, which may additionally be based on a location of underlying structures (e.g., studs, sheathing, decking, etc.). Once the base is coupled to the structure, the replacement tile may be aligned with an existing roof structure (e.g., other tiles), and then marked to indicate the location of the threaded passageway that is disposed beneath the replacement tile. To mark the replacement tile, once the replacement tile is aligned and in place, vertically above the cap, a hammer, object, or other tool may be used to strike the replacement tile proximate to a location of the cap. This strike results in a cut, mark, score, or other indent on the replacement tile. From there, in an embodiment, a hole may be drilled through the replacement tile at the indicated location. Accordingly, when placed on the roof, the hole drilled through the replacement tile may align with the threaded passageway of the stanchion in order to receive the fastener.

Alternatively, rather than requiring a hole to be drilled through the replacement tile, the cutting edge of the cap may pierce through the replacement tile and sever a fragment from the replacement tile. In other words, the hole may be formed by striking the replacement tile with the hammer until the leading edge has penetrated the replacement tile. This may eliminate the need to separately drill the hole through the replacement tile. Instead, striking the replacement tile may cause the leading edge of the collar to pierce through the replacement tile, from a bottom surface to a top surface of the replacement tile, in order to form the hole for the fastener. As such, an installation time of the replacement tile may be reduced, safety may be increased, and/or less tools may be required of the installer. For example, the installer may not be required to carry to drill, drill bits, switch between tools, etc. However, piercing the replacement tile to create the hole, without the use of the drill, for example, may increase an installation time of the replacement tile.

In an embodiment, the fastener used to secure the replacement tile to the stanchion may also secure the bracket to the stanchion. For example, the fastener may be disposed through the bracket, through the replacement tile (via the hole created), and then into the threaded passageway of the stanchion. When the fastener is tightened, the replacement tile may become clamped between the stanchion and the bracket. As such, the base, the stanchion, locking mechanism, and the cap may be disposed vertically below the replacement tile, while the bracket may be disposed vertically above the replacement tile. In an embodiment, other rails, frames, etc. that mount the photovoltaic modules to the structure may couple to the bracket.

The replacement tile may be manufactured from sheet metal, and formed via stamping operations, cutting operations, etc. Further, although the discussion herein is with regard to securing a replacement tile to the surface using the mounting system, in an embodiment, other flashings, plates, etc. may be used. For example, rather than securing a replacement tile to the mounting system, flashing may be secured to the mounting system.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

Figure 1:
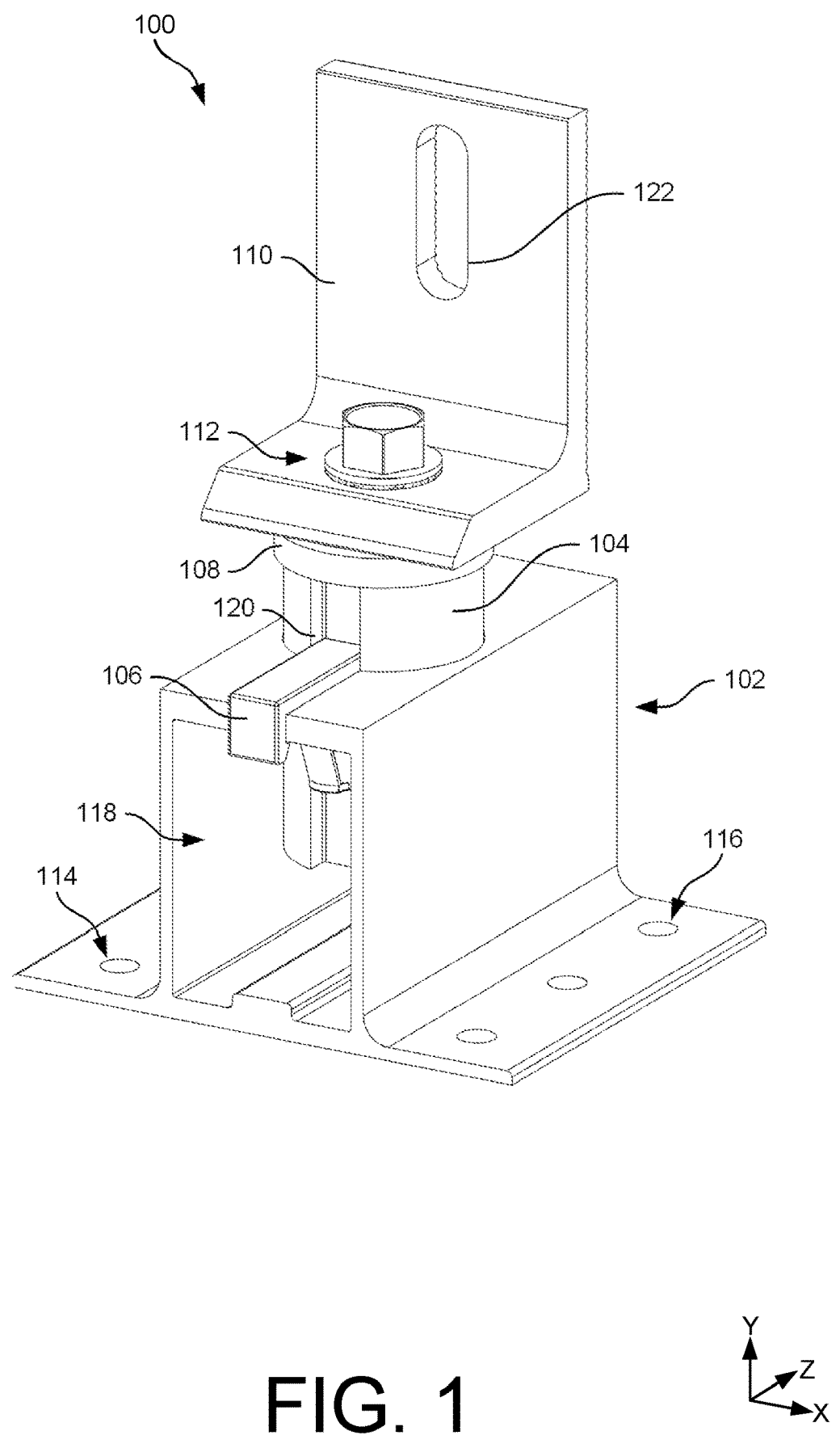

FIG. 1 illustrates an example mounting system 100 used to mount a replacement tile and/or photovoltaic modules to a surface, according to embodiments of the present disclosure. In an embodiment, the mounting system 100 may include a base 102, a stanchion 104, a locking mechanism 106, a cap 108, a bracket 110, and a fastener 112.

The base 102 may secure to the surface via fasteners. For example, the base 102 may include first holes 114 and second holes 116 that receive fasteners for coupling the base 102 to the structure, such as sheathing, studs, etc. In an embodiment, the first holes 114 and/or the second holes 116 may be used to secure the base 102. Moreover, not all of the first holes 114 and/or the second holes 116 may be used. The base 102 also includes a channel 118 that receives at least a portion of the stanchion 104. For example, as will be discussed herein the base 102 may define a receptacle that receives the stanchion 104. Additionally, a post may be coupled to the base 102, and may extend into the channel 118 for engaging with the stanchion 104, which is rotatable about the post for adjusting a height of the stanchion 104 that is external to the base 102. For example, the stanchion 104 may be rotated in a first direction to extend out of the channel 118 and may be rotated in a second direction to retract into the channel 118. Rotation of the stanchion 104 adjusts a height of the replacement tile coupled to the mounting system 100 for accommodating differently sized roofs.

The stanchion 104 includes a groove 120 that is engaged by the locking mechanism 106. In an embodiment, the locking mechanism 106 may represent a clip that secures to the base 102 (e.g., sides, surfaces, etc.) and which engages with or within the groove 120. The engagement between the locking mechanism 106 and the groove 120 may prevent rotation of the stanchion 104. For example, once the stanchion 104 is adjusted to a desired height (e.g., via rotation of the stanchion 104), the locking mechanism 106 may engage with the groove 120 to lock the stanchion 104 in place and prevent unwanted movement (e.g., rotation) of the stanchion 104.

The cap 108 is disposed on an end of the stanchion 104, at a location external to the channel 118. The cap 108 may sit atop the stanchion 104, external to the channel 118, for striking the replacement tile. For example, as will be explained herein, the cap 108 may include a collar having a leading or cutting edge that deforms, indents, cuts, pierces, etc. the replacement tile coupled to the mounting system 100. In an embodiment, the cap 108 may pierce through the replacement tile, thereby creating a hole, aperture, etc. through the replacement tile, or the cap 108 may indent the replacement tile, and thereafter, a hole may be drilled at the indented location. Regardless of how the hole is formed, the fastener 112 may be threaded into the stanchion 104.

The fastener 112 may also be disposed through an opening in the cap 108, so as to be received within the stanchion 104. The fastener 112 is also used to couple the bracket 110 to the stanchion 104. More particularly, the replacement tile may be disposed between the cap 108 and the bracket 110, and when the fastener 112 is tightened, the bracket 110 and the replacement tile are secured to the stanchion 104, and therefore, the structure.

Additionally, the bracket 110 may receive rails, frames, or other mounting equipment of the photovoltaic modules. For example, the bracket 110 is shown including a slot 122 that may receive fasteners for coupling the rails to the bracket 110. The photovoltaic modules may couple to the rails for disposing the photovoltaic modules above the surface, or the roof of the structure.

Figure 2B:
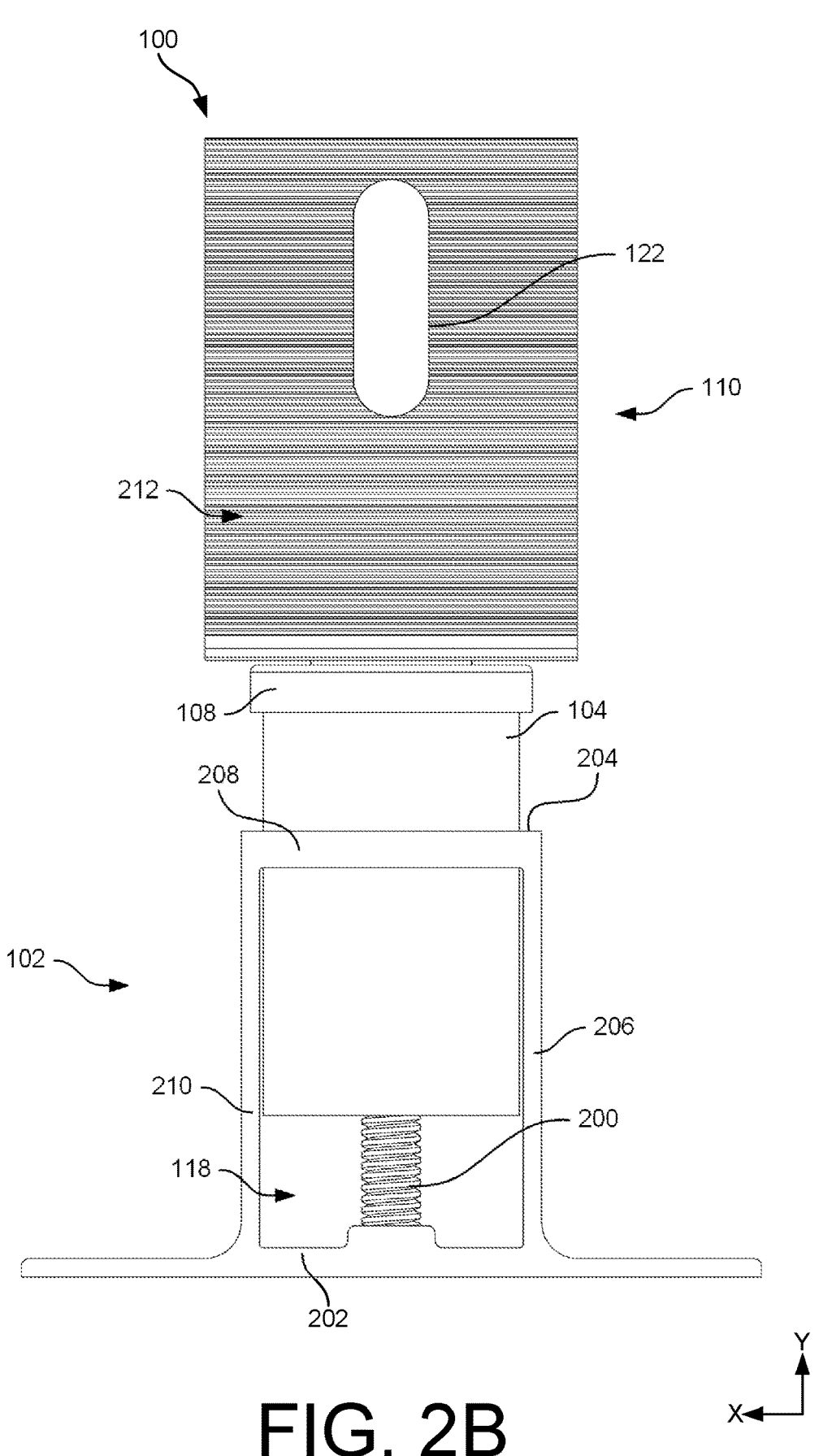
FIG. 2B illustrates a second side view of the mounting system of FIG. 1, according to embodiments of the present disclosure.

FIGS. 2A and 2B illustrates side views of the mounting system 100, according to embodiments of the present disclosure. In an embodiment, the views shown in FIGS. 2A and 2B illustrate end views of the mounting system 100 (e.g., front and back views).

As introduced above, the mounting system 100 may include the base 102, the stanchion 104, the locking mechanism 106, the cap 108, the bracket 110, and the fastener 112. In addition, the mounting system 100 may include a post 200. In an embodiment, the post 200 may be secured to the base 102 and extend into the channel 118 of the base 102 for engaging with the stanchion 104. For example, the post 200 may include threads that engage with threads of the stanchion 104. The stanchion 104 is rotatable about the post 200, for example, such that the stanchion 104 may be further threaded onto the post 200 (e.g., further into the channel 118), or off the post 200 (e.g., further out of the channel 118).

As an example, the stanchion 104 may be rotated in a first direction (e.g., clockwise about the Y-axis) to descend into the channel 118 and may be rotated in a second direction (e.g., counterclockwise about the Y-axis) to extend from the channel 118. When the stanchion 104 descends into the channel 118, a distance between the stanchion 104 and a bottom 202 of the channel 118 may be lessened, and when the stanchion 104 extends out of the channel 118, the distance between the stanchion 104 and the bottom 202 of the channel 118 may be increased. Stated alternatively, when the stanchion 104 descends into the channel 118, an amount of the stanchion 104 disposed external to a top surface 204 of the base 102 may decrease, and when the stanchion 104 extends from the channel 118, an amount of the stanchion 104 disposed above the top surface 204 of the base 102 may increase.

The locking mechanism 106 is configured to control rotation of the stanchion 104. For example, in FIG. 2A, the locking mechanism 106 is shown being engaged with the groove 120 to prevent rotation of the stanchion 104. In such instances, the stanchion 104 is prevented from rotating about the post 200 to extend from or descend into the channel 118. However, the locking mechanism 106 may be removed to permit the stanchion 104 to be rotated to a desired position, and thereafter, may be engaged with the groove 120 again. In an embodiment, the locking mechanism 106 is configured to clip onto sidewalls of the base 102. For example, the base 102 may include a first sidewall 206, a second sidewall 208, and a third sidewall 210. The locking mechanism 106 may clip onto the second sidewall 208, for example, to secure the locking mechanism to the base 102 and in the groove 120. The first sidewall 206, the second sidewall 208, and the third sidewall 210 may at least partially define the channel 118.

In an embodiment, the first sidewall 206 and/or the third sidewall 210 provide lateral support to the stanchion 104. For example, minimal spacing (e.g., gap) may be disposed between the stanchion 104 and the first sidewall 206 and/or the third sidewall 210. As loads are experienced by the stanchion 104 (e.g., about the Z-axis), the stanchion 104 may abut, contact, or otherwise engage with the first sidewall 206 and/or the third sidewall 210 to prevent bending of the stanchion 104 and/or the post 200. This may be especially important when the stanchion 104 is disposed at greater lengths from the channel 118, as the engagement between the stanchion 104, the first sidewall 206, and/or the third sidewall 210 may prevent bending of the stanchion 104 and/or the post 200.

In an embodiment, the bracket 110 includes notches 212 disposed along a portion of a height of the bracket 110. The notches 212 may receive, or otherwise engage with, corresponding notches on frames used to couple the photovoltaic modules to the mounting system 100. For example, the frame may be engaged with corresponding notches to adjust a height or location at which the frame couples to the bracket 110. Once in a desired location, a fastener may be disposed through the frame and the slot 122 for coupling the frame to the bracket 110.

Figure 3A:
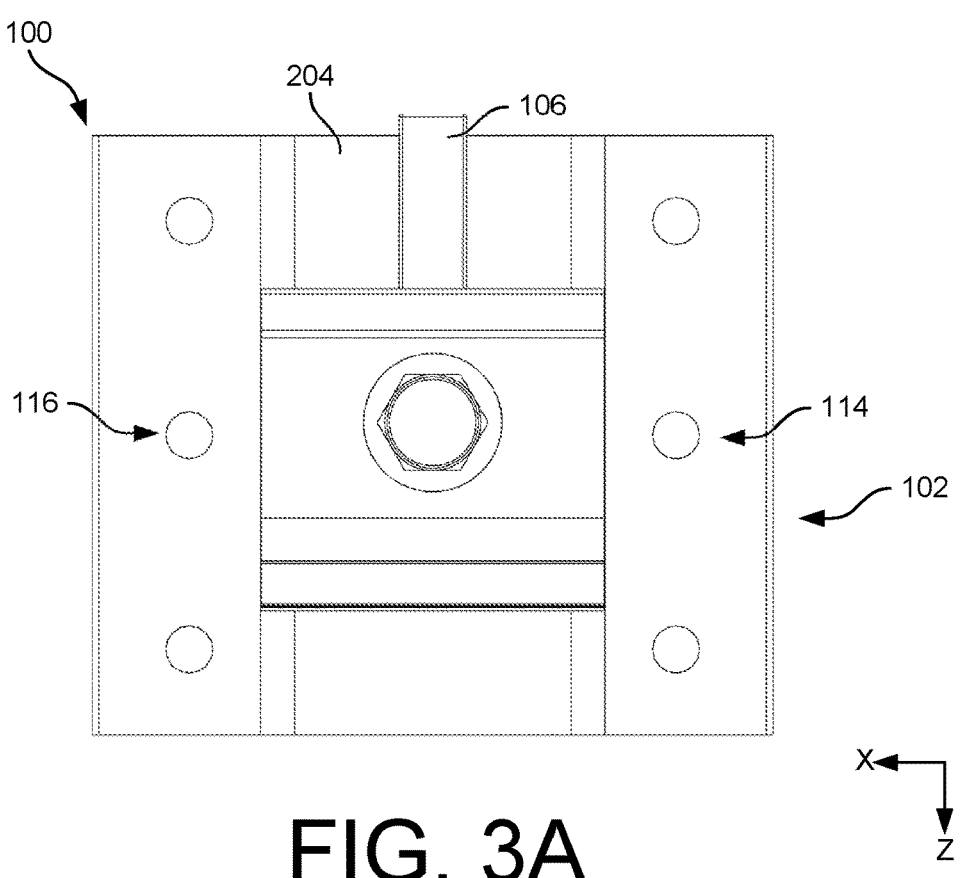
FIG. 3A illustrates a third side view of the mounting system of FIG. 1, according to embodiments of the present disclosure.
Figure 3B:
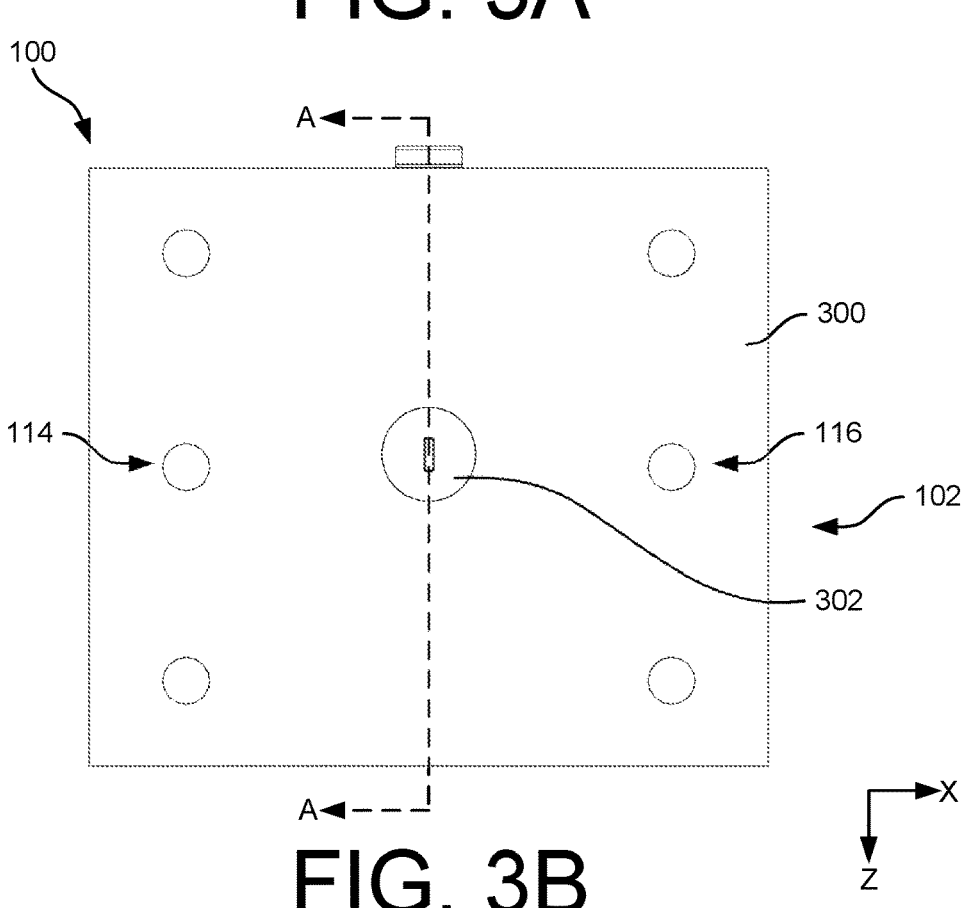
FIG. 3B illustrates a fourth side view of the mounting system of FIG. 1, according to embodiments of the present disclosure.

FIGS. 3A and 3B illustrate side views of the mounting system 100, according to embodiments of the present disclosure. In an embodiment, FIG. 3A illustrates a top view of the mounting system 100, and FIG. 3B illustrates a bottom view of the mounting system 100.

The base 102 includes the first holes 114 and the second holes 116 for coupling the base 102 to the structure. In an embodiment, the base 102 may include three of the first holes 114 and/or three of the second holes 116, however, the base 102 may include more than or less than three of the first holes 114 and/or more than or less than three of the second holes 116. Further, the first holes 114 and/or the second holes 116 may be located differently than shown.

The post 200 may be secured to the base 102, for example, in a bottom surface 300 of the base 102. The bottom surface 300 may abut or be placed on the surface of the structure to which the base 102 is coupled. In an embodiment, the post 200 includes a head 302 that is pressed, threaded into, or otherwise seated in the base 102. The base 102 may include an opening that accommodates the head 302, such that the bottom surface 300 may be planar when installed on the surface. In an embodiment, the post 200 may be coupled to the base 102 in order to resist rotation (e.g., as the stanchion 104 extends from and/or descends onto the post 200).

The locking mechanism 106 may further be disposed above the top surface 204 of the base 102, such as atop the second sidewall 208, for engaging with the groove 120 in the stanchion 104. In an embodiment, and as shown, a portion of the locking mechanism 106 may extend beyond a square perimeter of the base 102, for example, when locking mechanism 106 engages with the second sidewall 208.

Figure 4A:
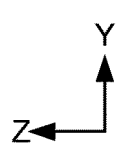
FIG. 4A illustrates a fifth side view of the mounting system of FIG. 1, according to embodiments of the present disclosure.
Figure 4B:
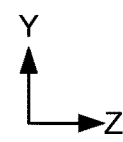
FIG. 4B illustrates a sixth side view of the mounting system of FIG. 1, according to embodiments of the present disclosure.

FIGS. 4A and 4B illustrate side views of the mounting system 100, according to embodiments of the present disclosure. In an embodiment, FIGS. 4A and 4B illustrate left and right-side views of the mounting system 100.

The stanchion 104 is configured to extend by various heights from the top surface 204 of the base 102, or the second sidewall 208, for accommodating differently sized tile roofs. Moreover, the cap 108 is disposed on an end of the stanchion 104, opposite and end of the stanchion 104 received in the channel 118, and the bracket 110 couples to the stanchion 104 via the fastener 112.

In an embodiment, the base 102 includes a first end 400 and a second end 402 spaced apart from the first end 400 (e.g., in the Z-direction). In an embodiment, the locking mechanism 106 may clip onto the first end 400 of the base 102 in order to secure the locking mechanism 106 to the base 102. For example, the locking mechanism 106 may include a flange disposed over the second sidewall 208, and into the channel 118, for securing the locking mechanism 106 to the base 102. Although the locking mechanism 106 is shown securing to the base 102 at the first end 400, the locking mechanism 106 may additionally or alternatively secure to the base 102 at the second end 402. In such instances, the stanchion 104 may include more than or less than one groove engaged by the locking mechanism 106 (or respective locking mechanisms). Regardless of the specific embodiment, the groove 120 may be aligned with the ends of the base 102 such that the locking mechanism 106 may be received with the groove 120 and secured to the base 102.

The bracket 110 may include a first flange 404 and a second flange 406. In an embodiment, the first flange 404 includes a passage through which the fastener 112 is disposed for being received by the stanchion 104. The second flange 406 may extend transverse to the first flange 404 and include the slot 122 as well as the notches 212.

Figure 5:
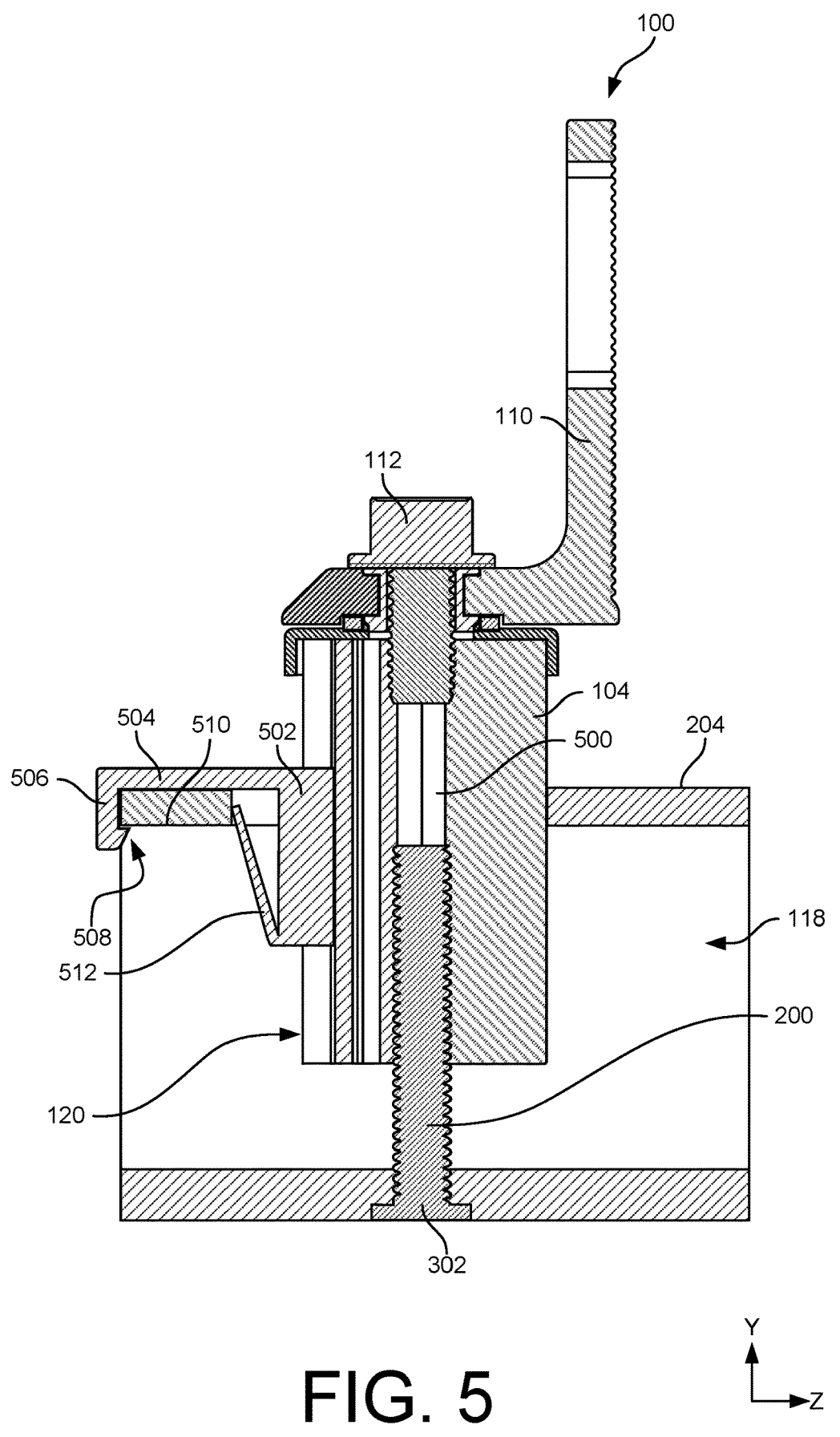

FIG. 5 illustrates a cross-sectional view of the mounting system 100, taken along line A-A of FIG. 3B, according to embodiments of the present disclosure. The stanchion 104 is rotatably coupled to the post 200 and is received at least partially within the channel 118 of the base 102. For example, the post 200 may be coupled to the base 102, within the bottom surface 300 of the base 102, so as to extend into the channel 118. In an embodiment, the post 200 may be threaded into the base 102, press-fit into the base 102, welded to the base 102, and so forth.

The post 200 includes threads that engage with corresponding threads of a passageway 500 of the stanchion 104. In doing so, the stanchion 104 may be threaded onto the post 200 for coupling the stanchion 104 to the post 200, and therefore, the base 102. Depending upon the desired height of the stanchion 104, the stanchion 104 may be threaded onto the post 200 by different amounts. Furthermore, the fastener 112 is received within the passageway 500 for coupling to the stanchion 104, as well as securing the cap 108, the bracket 110, and the replacement tile to the stanchion 104. As shown, the post 200 may be received within the stanchion 104 at a first end of the stanchion 104, and the fastener 112 may be received within the stanchion 104 at a second end of the stanchion 104, spaced apart from the first end (e.g., in the Y-direction).

The fastener 112 is also disposed through an opening in the cap 108 and the bracket 110. In an embodiment, the cap 108 includes a pocket that resides over the second end of the stanchion 104. The pocket may reside over the second end to orient the cap 108 on the stanchion 104, and to prevent the cap 108 sliding off the stanchion 104. In an embodiment, although the stanchion 104 and the cap 108 are described as separate components, the stanchion and the cap 108 may be a single component.

The locking mechanism 106 engages with the base 102 and the groove 120 of the stanchion 104. In an embodiment, and as will be discussed herein with regard to FIGS. 10A and 10B, the locking mechanism 106 may include a first arm 502, a second arm 504, and a third arm 506. At least a portion of the first arm 502 may be engaged within the groove 120, the second arm 504 may be disposed across the top surface 204 (e.g., along the second sidewall 208), and the third arm 506 may be disposed over the first end 400 of the base 102. Further, the third arm 506 may include a flange 508 that engages with an interior surface 510 of the channel 118. The engagement between the flange 508 and the interior surface 510 may attach the locking mechanism 106 to the base 102. In an embodiment, the first arm 502, including the flange 508, may snap over the second sidewall 208 to engage the interior surface 510.

The locking mechanism 106 may also include a tab 512 that extends from the first arm 502. In an embodiment, the tab 512 may be biased through an opening of the base 102, such as the second sidewall 208, and/or may engage with the interior surface 510 (at a location spaced apart from where the flange 508 engages with the interior surface 510). In an embodiment, the tab 512 may be deflected (e.g., in the Z-direction) to fit through the opening, such as when the locking mechanism 106 is secured to the base 102, and thereafter, may be deflected (e.g., in an opposite Z-direction) to engage with the interior surface 510 and prevent removal of the locking mechanism 106 from the base 102. Alternatively, the tab 512 may be disposed within the opening, and engage a surface of the opening, to bias the first arm 502 toward the groove 120. In either scenario, the tab 512 may deflect, bends, or otherwise curve to provide a biasing force against to secure the locking mechanism 106 in place and prevent inadvertent removal of the locking mechanism 106. However, the locking mechanism 106 may be removably coupled from the base 102, for example, by biasing the tab 512 inwards (e.g., towards the stanchion 104 or the first arm 502) and such that the tab 512 may be lifted out through the opening. Simultaneously, or subsequently, the third arm 506 may be biased to disengage the flange 508 from the interior surface 510, thereby removing the locking mechanism from the base 102.

Figure 6:
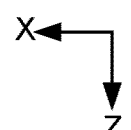
FIG. 6 illustrates a cross-sectional view of the mounting system of FIG. 1, taken along line B-B of FIG. 4A, according to embodiments of the present disclosure.
Figures 7A, 7B:
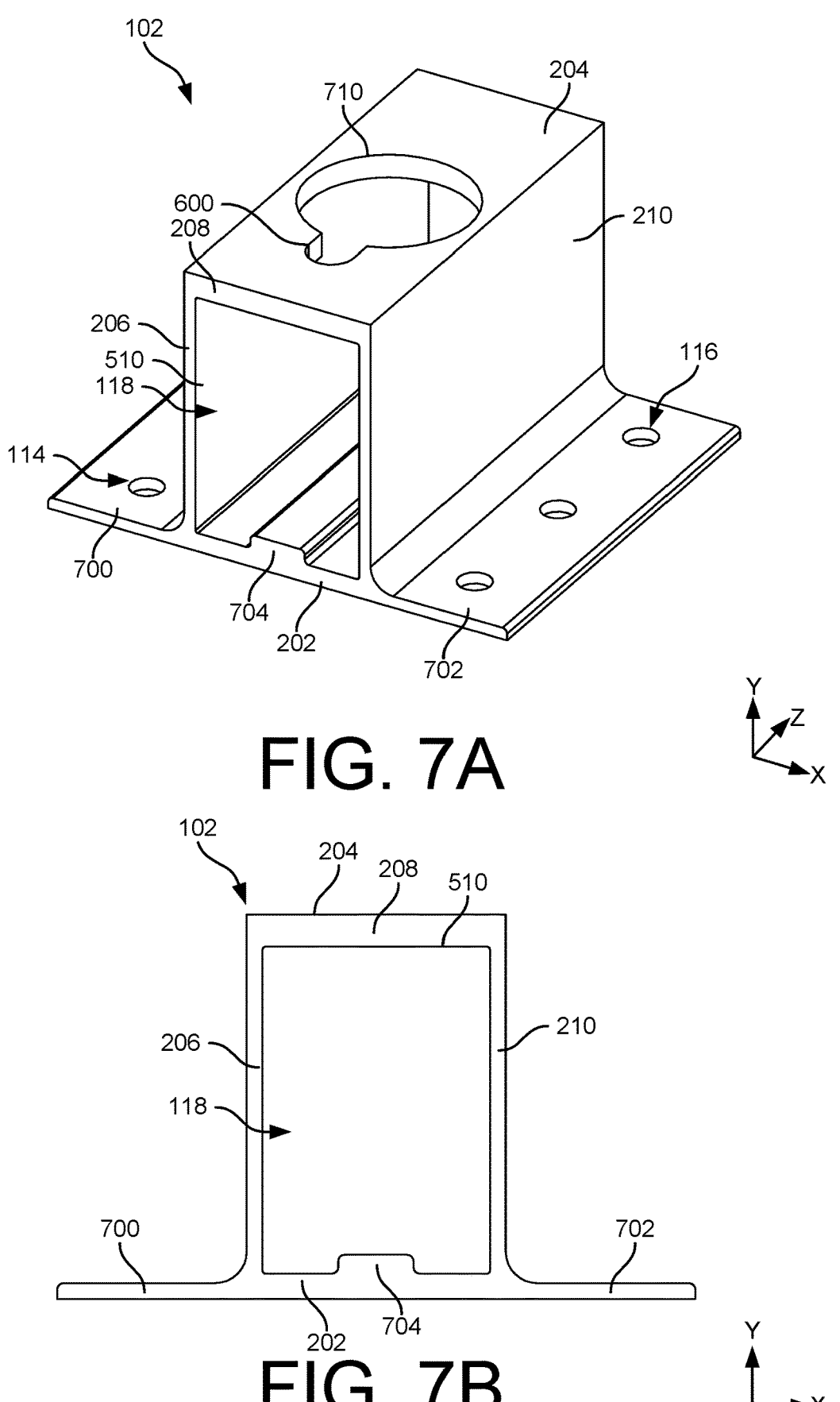
FIGS. 7A-7D illustrate an example base that may be usable with the mounting system of FIG. 1, according to embodiments of the present disclosure.
Figures 7C, 7D:
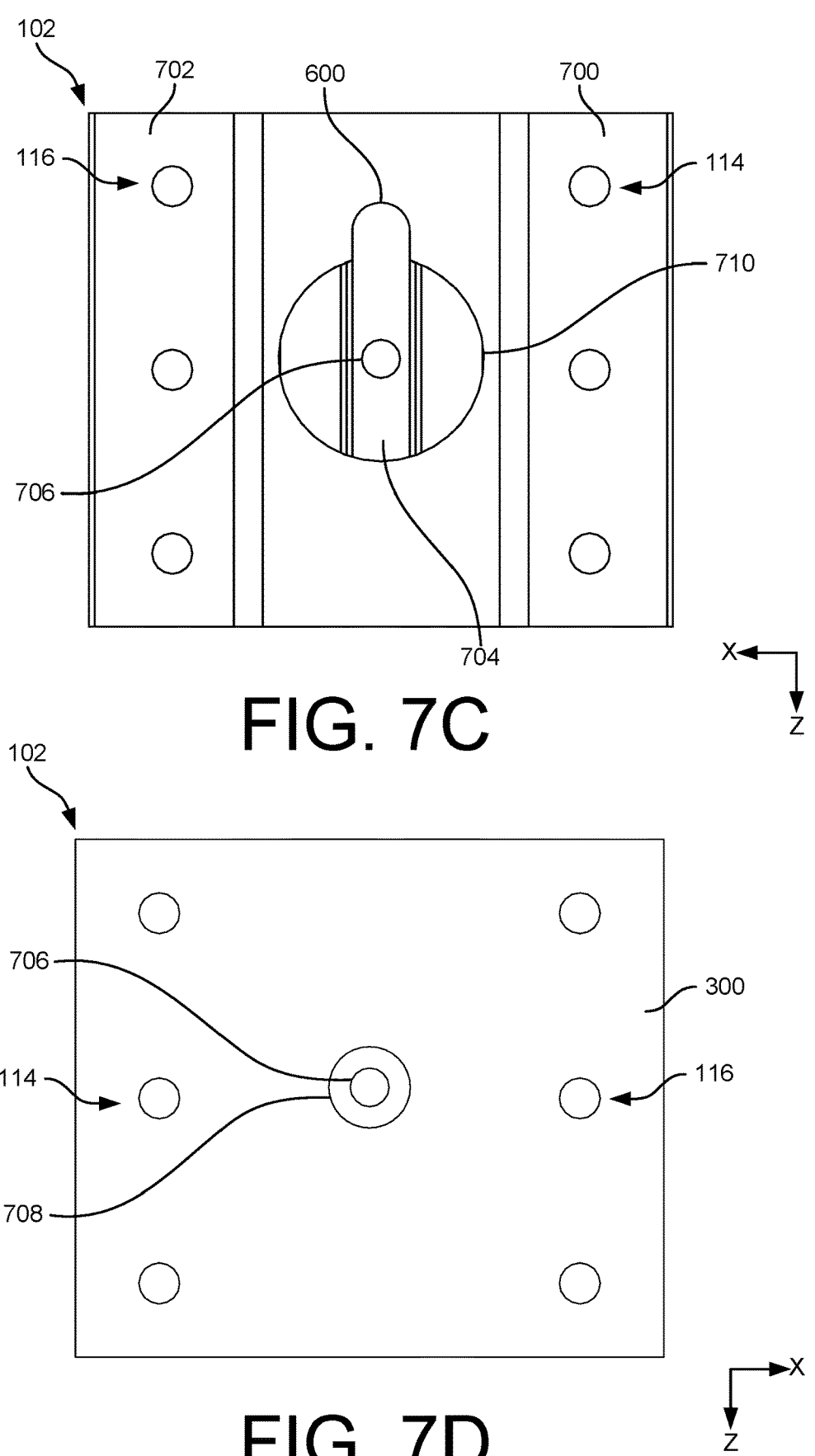

FIG. 6 illustrates a cross-sectional view of the mounting system 100, taken along line B-B of FIG. 4A, according to embodiments of the present disclosure. The stanchion 104 is received within the base 102 and disposed about the post 200. Additionally, the first arm 502 of the locking mechanism 106 engages with the groove 120 to prevent rotation of the stanchion 104. The base 102 is also shown including an opening 600 through which the tab 512 is insertable when the locking mechanism 106 is secured to the base 102. For example, the opening 600 may be disposed through the second sidewall 208. In an embodiment, the tab 512 may be disposed within the opening 600, or may be pushed (e.g., squeezed together to bring the tab 512 and the first arm 502 in close proximity) through the opening 600 such that after pushing through the opening 600, the tab 512 may deflect outwards to engage the interior surface 510 of the channel 118. As such, an end of the tab 512 may be disposed within the opening 600, or external to the opening 600 to engage the interior surface 510. In addition, the third arm 506 is disposed over the first end 400 of the base 102 to secure the locking mechanism 106 to the base 102.

FIGS. 7A-7D illustrate various views of the base 102, according to embodiments of the present disclosure. In an embodiment, the base 102 includes the bottom 202 having a first flange 700 and a second flange 702. The first holes 114 may be disposed through the first flange 700, and the second holes 116 may be disposed through the second flange 702. In an embodiment, rather than the first flange 700 and the second flange 702 including the first holes 114 and the second holes 116, respectively, the first flange 700 and/or the second flange 702 may include slots that span in a direction between the first end 400 and the second end 402 of the base 102. Including the slots may permit fasteners to be disposed through a number of locations for fastening into the structure.

Furthermore, in an embodiment, the first holes 114 and the second holes 116 may be aligned (e.g., along the X-plane), and/or parallel to an edge or side of the base 102. However, in an embodiment, the first holes 114 and the second holes 116 may not be aligned, such that the first holes 114 and the second holes 116 may be staggered (e.g., spaced apart in the X-direction and/or Z-direction from one another). The staggering of the first holes 114 and the second holes 116 may permit the fasteners to be secured into the structure (e.g., studs, sheathing, etc.). In other words, the staggering of the first holes 114 and/or the second holes 116, respectively, may align a portion of the first holes 114 and/or a portion of the second holes 116 with the structure for securing the base 102 to the structure. Comparatively, if the first holes 114 and/or the second holes 116 were aligned (e.g., in the X-direction and/or the Z-direction), the first holes 114 and/or the second holes 116 may not align with studs of the structure, and/or one or more of the first holes 114 and/or the second holes 116 may fall on a seam of the sheathing. In an embodiment, the first holes 114 may be staggered (e.g., spaced apart in the X-direction) relative to one another, the second holes may be 116 staggered (e.g., spaced apart in the X-direction) relative to one another, and/or the first holes 114 and the second holes 116 may be staggered relative to one another (e.g., in the Z-direction).

Still, in an embodiment, one or more of the first holes 114 may be aligned with one or more of the second holes 116, while other holes of the first holes 114 and the second holes 116 may not be aligned. For example, a middle hole of the first holes 114 may be aligned (e.g., in the Z-direction), with a middle hole of the second holes 116. This may, in an embodiment, two holes to be aligned with a rafter, stud, etc.

but the remaining first holes 114 and second holes 116 staggered for attaching to sheathing or other decks.

In an embodiment, the first sidewall 206 may extend transverse from the bottom 202, the second sidewall 208 may extend transverse from the first sidewall 206 (and/or the third sidewall 210), and/or the third sidewall 210 may extend transfer from the bottom 202. The first sidewall 206, the second sidewall 208, the third sidewall 210, and the bottom 202 may define the channel 118. As shown, and In an embodiment, the first sidewall 206 and/or the third sidewall 210 may be longer in length (e.g., in the Y-direction) than the second sidewall 208 (e.g., in the X-direction).

The bottom 202 is shown including a protrusion 704, which may represent a thicker section of the bottom 202. The protrusion 704 may span between the first end 400 and the second end 402 of the base 102, within the channel 118. In an embodiment, the protrusion 704 may provide support to the post 200 (or the head 302) secured to the base 102. For example, the post 200 may be threaded into the base 102, via an opening 706, at a location that includes the protrusion 704 to support the post 200 within the channel 118. In other words, the bottom 202 and/or the protrusion 704 may include threads for receiving the post 200 in order to provide increased fastening between the post 200 and the base 102. The base 102, such as the bottom surface 300, may further include a recess 708 into which the head 302 of the post 200 is disposed when fastened to the base 102. In an embodiment, the opening 706 and/or the recess 708 are centrally located on the base 102

The base 102 may include a receptacle 710 for receiving the stanchion 104. In an embodiment, the receptacle 710 may be substantially cylindrical in shape such that the stanchion 104 may be threaded (e.g., rotated) onto the post 200. The receptacle 710 may be disposed through the second sidewall 208, between the top surface 204 and the channel 118 (or the interior surface 510). When disposed within the receptacle 710, an exterior surface of the stanchion 104 may at least partially abut, contact, or rest against sidewalls of the receptacle 710 to provide support to the stanchion 104 and reduce lateral movements (e.g., in the X-direction and/or the Z-direction). The receptacle 710 may be concentric within the opening 706 such that the stanchion 104 is cable of being threaded onto the post 200 without interference. In an embodiment, the receptacle 710 is centrally located on the base 102, or through the second sidewall 208 (e.g., in the X-direction and/or Z-direction).

The opening 600 is adjoined to, or extends from, the receptacle 710. The opening 600, as introduced above, may accommodate the first arm 502 and the tab 512 of the locking mechanism 106. For example, to fit through the opening 600, the tab 512 may be biased (e.g., pushed) towards the first arm 502 in order to be insertable into the opening 600 (e.g., in the Y-direction). Once pushed through the opening 600, the tab 512 may bias outwards (e.g., away from the first arm 502) to engage the interior surface 510. However, an embodiment, the tab 512 may be disposed within the opening 600, and engage a surface of the opening 600 provide a biasing force to secure the first arm 502 within the groove 120. In an embodiment, the opening 600 is substantially circular shaped, however, other shapes are envisioned (e.g., square, rectangular, hexagonal, etc.).

In an embodiment, the base 102 may represent a piece of extruded material (e.g., aluminum, plastic, etc.). The first holes 114, the second holes 116, the opening 600, the receptacle 710, and/or other portions of the base 102 may be formed via post-processing techniques (e.g., milling, machining, stamping, etc.). The base 102 may be substantially square shaped (e.g., about the X-Z plane), however, other shapes are envisioned, such as being circular, hexagonal, and so forth.

Figure 8:
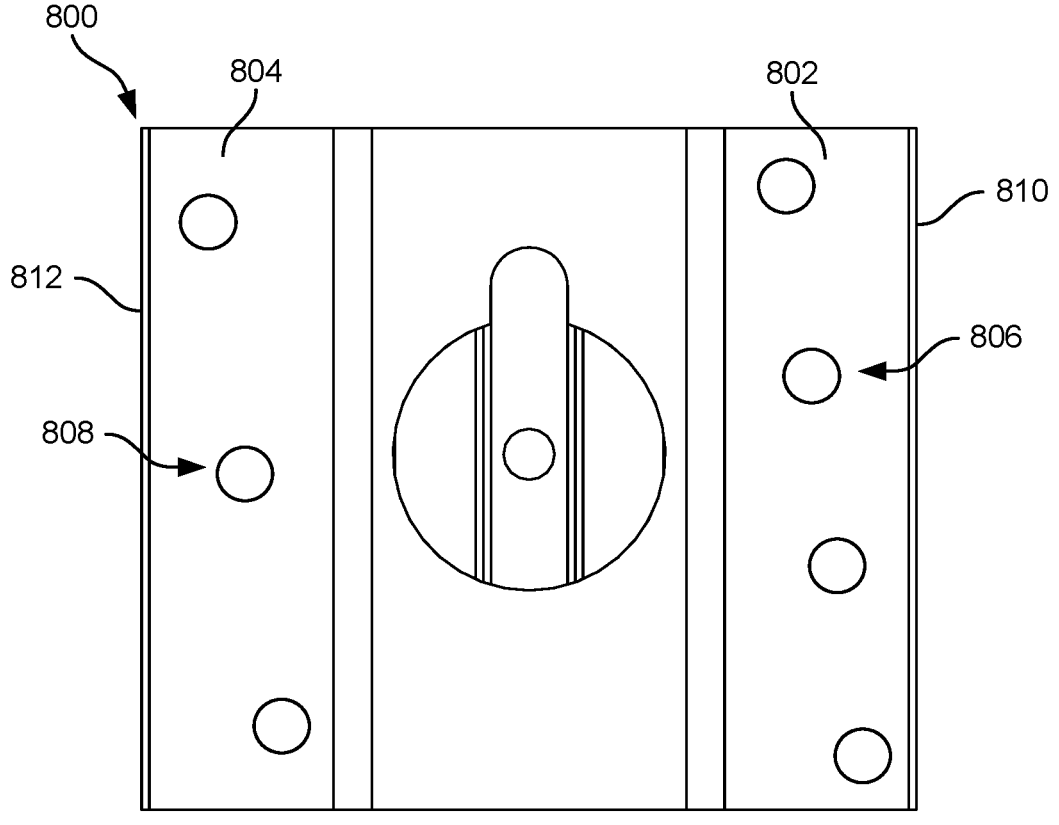
FIG. 8 illustrates an example base that may be usable with the mounting system of FIG. 1, according to embodiments of the present disclosure.
Figure 8:
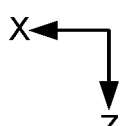

FIG. 8 illustrates an alternate base 800, according to embodiments of the present disclosure. In an embodiment, the base 800 may be similar to the base 102, and may be usable with the mounting system 100. As such, although the discussion herein may be with regard to the base 102, the base 800 may be usable with the mounting system 100.

The base 800 may include a first flange 802 and a second flange 804. The base 800 may include first holes 806 disposed through, or located on, the first flange 802, and may include second holes 808 disposed through or located on, the second flange 804. Compared to the first holes 114 and the second holes 116, the first holes 806 and the second holes 808 may be staggered.

For example, the first holes 806 may be spaced apart from a first edge 810 of the first flange 802 by different distances, and/or the second holes 808 may be spaced apart from a second edge 812 of the second flange 804 by different distances. In this sense, compared to the first holes 114 and the second holes 116, respectively, the first holes 806 and the second holes 808 may not be arranged parallel to the first edge 810 and the second edge 812, respectively. Moreover, individual holes of the first holes 806 may not be aligned with individual holes of the second holes 808 (e.g., along a plane that extend perpendicular to the first edge 810). The first holes 806 are also shown including four holes, whereas the second holes 808 are shown including three holes. However, the first holes 806 and the second holes 808 may include more than or less than four holes and three holes, respectively. Still, in some instances, the first holes 806 and/or the second holes 808 may be staggered, while another of the first holes 806 and the second holes 808 may not be staggered.

The staggering of the first holes 806 and the second holes 808 may permit at least two fasteners to penetrate a rafter or stud into which the base 800 is secured. Additionally, the staggering of the first holes 806 and the second holes 808 may permit the base 800 to be coupled to sheathing without more than one of the first holes 806 or more than one of the second holes 808 aligning with seams in the sheathing.

Figure 9A:
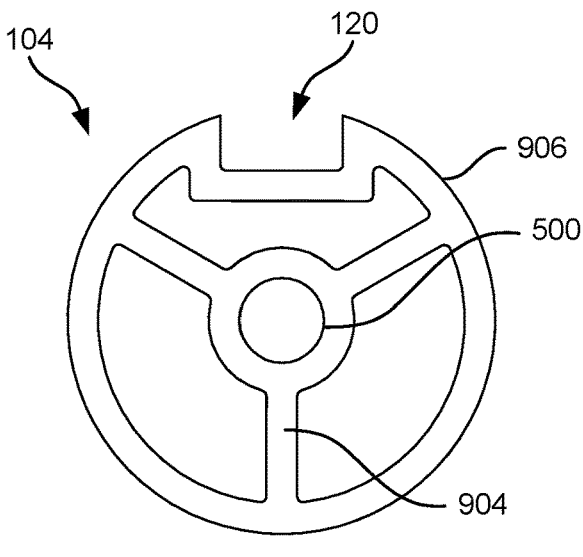
FIGS. 9A and 9B illustrate an example stanchion of the mounting system of FIG. 1, according to embodiments of the present disclosure.
Figure 9B:
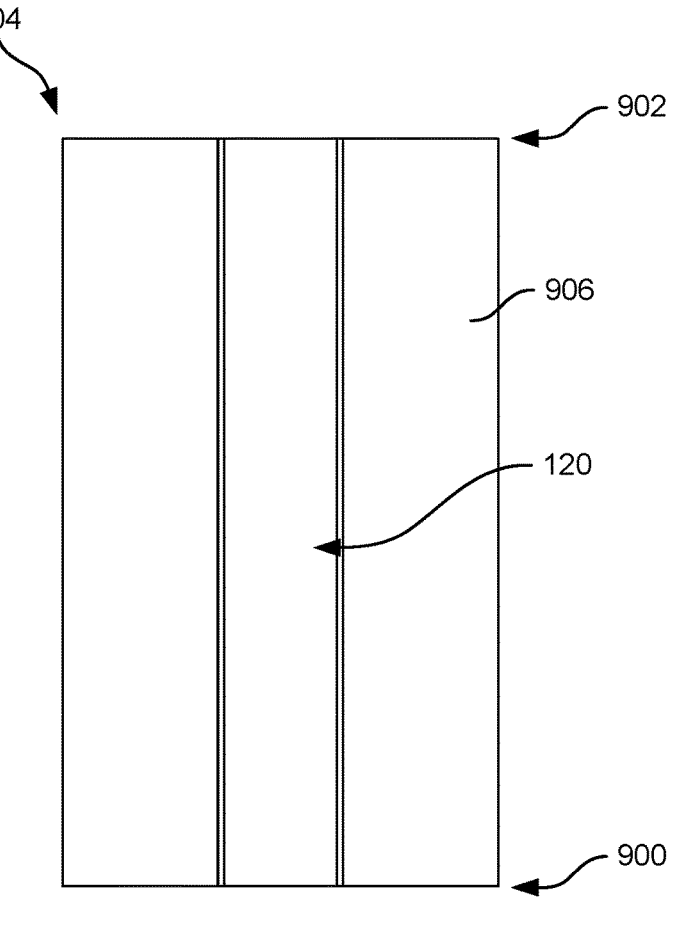

FIGS. 9A and 9B illustrate various views of the stanchion 104, according to embodiments of the present disclosure. In an embodiment, FIG. 9A illustrates an end view of the stanchion 104, and FIG. 9B illustrates a side view of the stanchion 104.

The stanchion 104 includes a first end 900 and a second end 902 spaced apart from the first end 900 (e.g., in the Y-direction). The first end 900 may be threaded onto the post 200, within the channel 118, while the second end 902 may receive the fastener 112. In an embodiment, the passageway 500 is disposed between the first end 900 and the second end 902. However, in other embodiments, the passageway 500 may not be continuous between the first end 900 and the second end 902. The passageway 500 may be supported via one or more struts 904 that extend from an interior surface of the stanchion 104. The use of the struts 904, as compared to having a solid stanchion 104, may reduce a weight of the stanchion 104.

The stanchion 104 may have an exterior surface 906 than defines the groove 120. As such, the groove 120 may be formed within the exterior surface 906. As shown, the groove 120 may extend between the first end 900 and the second end 902, however, In an embodiment, the groove 120 may extend less than a length of the stanchion 104 between the first end 900 and the second end 902. The groove 120 may include a substantially rectangular shape (e.g., in the X-Z plane), however, other shapes are envisioned (e.g., half-circular). In such instances, the first arm 502 (or a portion thereof engaged with the groove 120) may be differently shaped.

Although the stanchion 104 is shown including a single groove, the stanchion 104 may include more than one groove. In such instances, the locking mechanism 106 may be engaged with any one of the grooves, for example, to allow for quarter turns, half turns, full turns, and so forth of the stanchion 104. In other words, the stanchion 104 may not have to be rotated such the groove 120 is oriented towards the first end 400 of the base 102 in order for the locking mechanism 106 to be engaged with the base 102 and the groove 120. The use of multiple grooves may therefore permit any one of the grooves to be aligned with the first end 400, thereby enabling quarter turns or half turns of the stanchion 104, to secure the locking mechanism 106 to the base 102 and within the groove 120.

In an embodiment, the stanchion 104 may represent a piece of extruded material (e.g., aluminum, plastic, etc.). The passageway 500 and the groove 120 may be formed via post-processing techniques (e.g., milling, machining, etc.). For example, the passageway 500 may be machined to include the threads. The stanchion 104 may also take various lengths (e.g., one inch, two inches, four inches, six inches, etc.) for accommodating differently sized roofs.

Figure 10A:
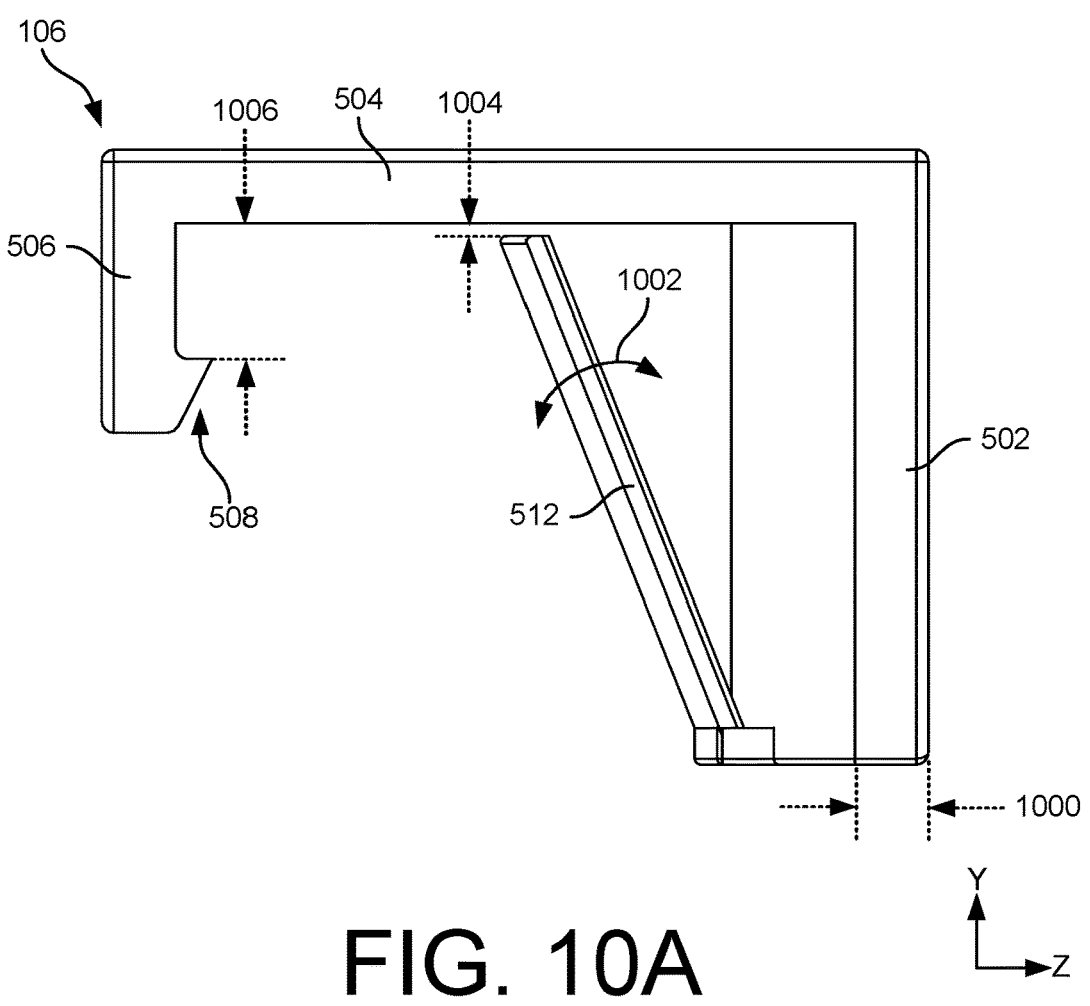
FIGS. 10A and 10B illustrate an example locking mechanism of the mounting system of FIG. 1, according to embodiments of the present disclosure.
Figure 10B:
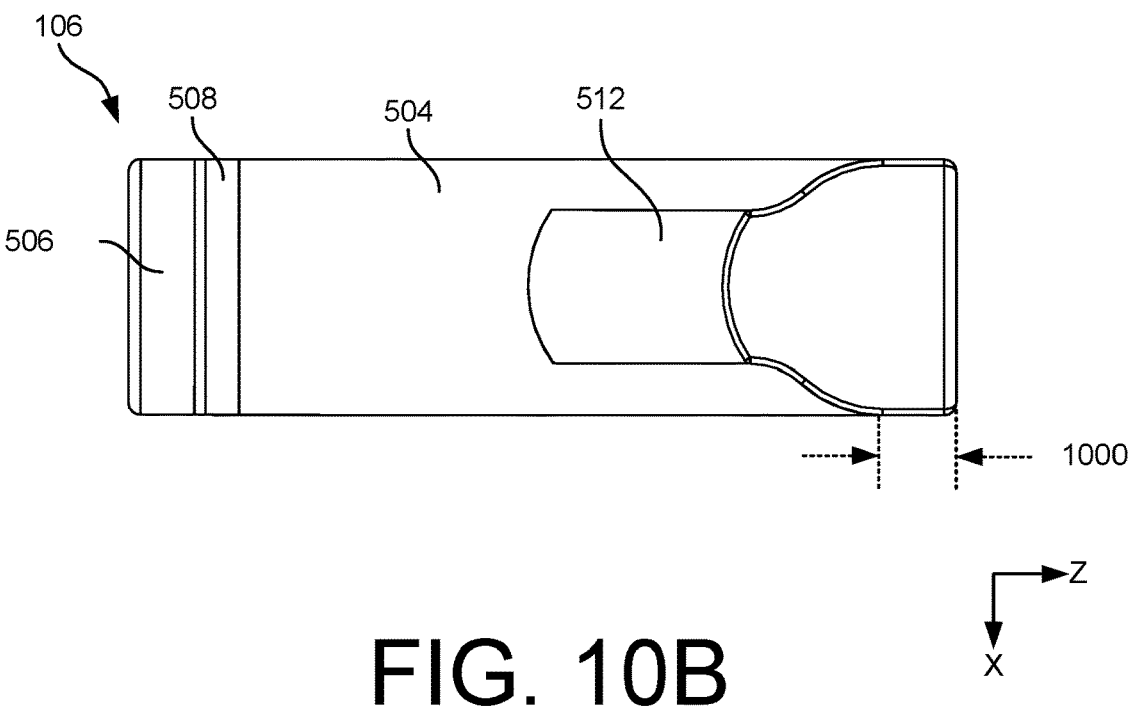

FIGS. 10A and 10B illustrate the locking mechanism 106, according to embodiments of the present disclosure. In an embodiment, FIG. 10A illustrates a side view of the locking mechanism 106, while FIG. 10B illustrates a bottom view of the locking mechanism 106.

Introduced above in FIG. 5, the locking mechanism 106 includes the first arm 502, the second arm 504, and the third arm 506. The second arm 504 may be disposed between the first arm 502 and the third arm 506. In an embodiment, the first arm 502 and/or the third arm 506 end transverse to, or from, the second arm 504. In an embodiment, the first arm 502 may be shorted in length (e.g., in the Y-direction) as compared to a length of the second arm 504 (e.g., in the Z-direction). Additionally, or alternatively, the third arm 506 may be shorter in length (e.g., in the Y-direction) as compared to the first arm 502 and/or the second arm 504.

When coupled to the base 102, and locking of the stanchion 104, a portion 1000 (e.g., in the Z-direction) of the first arm 502 may reside within the groove 120. For example, the portion 1000 of the first arm 502 may reside within sidewalls of the groove 120 in order to lock the stanchion 104 in place and prevent rotation of the stanchion 104. That is, the engagement between the first arm 502 and the groove 120, and the engagement between the locking mechanism 106 and the base 102, may prevent rotation of the stanchion 104.

The tab 512 extends from the first arm 502, at a location opposite to where the first arm 502 engages with the second arm 504. The tab 512 may be biased in a rotational direction 1002 (e.g., about the X-axis) in order to fit through the opening 600 and bias back to engage with the interior surface 510. For example, to fit through the opening 600, the tab 512 may be biased (e.g., pressed) towards the first arm 502. Once placed through the opening 600, the tab 512 may be biased outward, away from the first arm 502, to press against the interior surface 510. This force may secure the locking mechanism 106 in place and prevent disengagement with the base 102. Stated alternatively, an end of the tab 512 not coupled to the first arm 502 may be spaced apart from the second arm 504 by a distance 1004. When the locking mechanism 106 is secured to the base 102, the second arm 504 may reside above the top surface 204 of the base 102 (adjacent to the second sidewall 208), and the tab 512 may engage with the interior surface 510 to pinch the locking mechanism 106 to the base 102. In such instances, the distance 1004 between the end of the tab 512 and the second arm 504 may be increased, thereby providing a biasing force against the second sidewall 208 (e.g., via the thickness of the second sidewall 208). In an embodiment, the tab 512 may include a rectangular, circular, or other cross-sectional shape (e.g., about the X-Z plane).

Although the tab 512 is described as being pushed through the opening 600, in an embodiment, the tab 512 may engage with the base 102 within the opening 600. For example, the tab 512 may be partially disposed through the opening 600 such that an end of the tab 512 engages with a surface of the second sidewall 208 internal to the opening 600. The engagement between the end of the tab 512, and the surface of the second sidewall 208, for example, may bias the first arm 502 (or the locking mechanism 106) toward the groove 120. Accordingly, the tab 512 may act as a biasing member to impinge (e.g., press on) a portion of the base 102 within the opening 600 to push the first arm 502 towards the groove 120.

Furthermore, the first arm 502 includes the flange 508 that secures to the interior surface 510 of the channel 118 (along the second sidewall 208). In an embodiment, a distance 1006 is disposed between the second arm 504 and the flange 508, which corresponds to a thickness of the second sidewall 208. The flange 508 may snap over the second sidewall 208, at the first end 400, to secure the locking mechanism 106 in place. Accordingly, the first arm 502 may flex (e.g., about the X-axis) in order to flex the flange 508 over the first end 400, as well as to flex the first arm 502 away from the first end 400 when removing the locking mechanism 106. In an embodiment, the end of the tab 512 may be disposed the distance 1006 away from the second arm 504 when the locking mechanism 106 couples to the base 102.

In an embodiment, the locking mechanism 106 may be formed via injection molding. Additionally, given the biasing nature of portion of the locking mechanism 106, the locking mechanism 106 may be formed from a resilient, flexible, or deformable material.

Figure 11A:
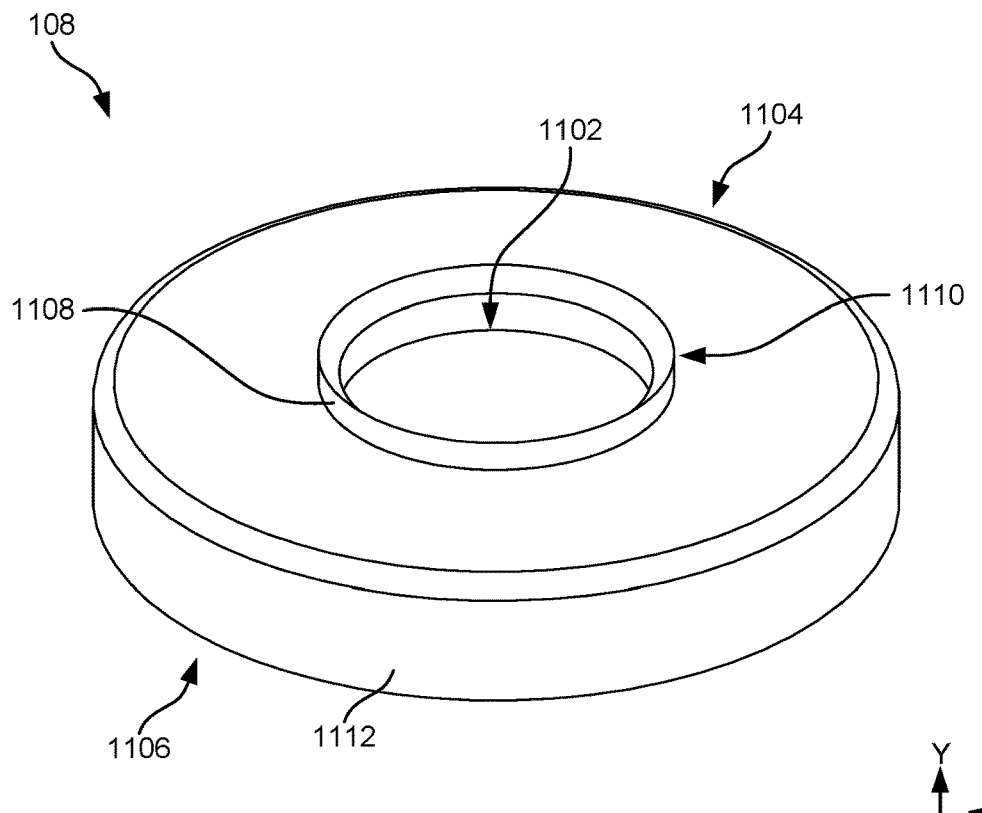
FIGS. 11A and 11B illustrate an example cap of the mounting system of FIG. 1, according to embodiments of the present disclosure.
Figure 11B:
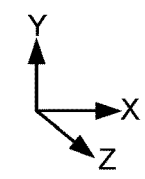

FIGS. 11A and 11B illustrate views of the cap 108, according to embodiments of the present disclosure. The cap 108 is configured to reside on the stanchion 104, for example, at the second end 902 of the stanchion 104. In an embodiment, the cap 108 includes a pocket 1100 that resides over the second end 902 of the stanchion 104 for securing the cap 108 onto the stanchion 104. Sidewall(s) 1112 may circumferentially extend around the cap 108 at the second end 902 for securing the cap 108 to the stanchion 104. The sidewall(s) 1112 may at least partially form the pocket 1100. The sidewall(s) 1112 may be disposed around the exterior surface 906 of the stanchion 104 for seating the cap 108 onto the stanchion 104 and prevent the cap 108 from falling off or otherwise engaging with the stanchion 104. As such, a cross-sectional dimension of the pocket 1100 (e.g., in the X and/or Z-direction) may be greater than a cross-sectional dimension of the second end 902 of the stanchion 104. The pocket 1100, or rather the sidewall(s) 1112, may include a depth (e.g., in the Y-direction) such that the sidewall(s) 1112 may be disposed around the stanchion 104.

In an embodiment, the cap 108 may not include the pocket 1100. Instead, in an embodiment, the cap 108 may be a flat piece of material (e.g., washer), with the passageway 1102 extending therethrough and the leading edge 1110 being formed on the top 1104.

The cap 108 additionally includes a passageway 1102 for accommodating the fastener 112, such that the fastener 112 may be threaded into the passageway 500 of the stanchion 104. The passageway 1102 may extend between a top 1104 and a bottom 1106 of the cap 108. During a tightening of the fastener 112, the replacement tile may become secured between the cap 108 and the bracket 110 (e.g., the first flange 404 of the bracket 110).

The cap 108 includes a collar 1108 that has a leading edge 1110 for scribing, deforming, indenting, puncturing, piercing, or otherwise penetrating the replacement tile. For example, the leading edge 1110 may come to a point, edge, etc. and include serrations, a cutting edge, and so forth that penetrate at least a portion of the replacement tile. In an embodiment, the leading edge 1110 may include a beveled cutting edge. During installation, for example, the replacement tile may be placed adjacent to the cap 108 (e.g., on top of the cap 108) and impacted (e.g., via a hammer, mallet, etc.) to pierce the replacement tile. In an embodiment, for example, a portion of the replacement tile adjacent to the cap 108 may be hit with a hammer, or other object, so as to puncture a corresponding portion of the replacement tile. In an embodiment, the replacement tile may be punctured by the leading edge 1110, thereby producing a knockout, fragment, hole punch, etc. through the replacement tile. In turn, the fastener 112 may be disposed through the replacement tile, at a location corresponding to the hole punch, and into the passageway 500 for securing the replacement tile to the stanchion 104. However, although describe as punching through the replacement tile, in an embodiment, the leading edge 1110 may mark (e.g., indent) the replacement tile following impact of the hammer. Therein, a hole may be drilled through the replacement tile, at the marking, such that the replacement tile may be fastened to the stanchion 104 via the fastener 112.

The cap 108 may be formed via punching a piece of material (e.g., metal). Although the cap 108 and the stanchion 104 are described as separate components, in an embodiment, the cap 108 and the stanchion 104 may be integrated within a single component, and/or the stanchion 104 may be formed with the leading edge 1110 to pierce the replacement tile. In such instances, the leading edge 1110 may be formed on the second end 902 of the stanchion 104, for example.

FIG. 12 illustrates the cap 108 mounted atop the stanchion 104, according to embodiments of the present disclosure. The cap 108 may be placed on the second end 902 of the stanchion 104. For example, the cap 108 may be placed or sit atop the stanchion 104 for puncturing a portion of a replacement tile. Here, atop the stanchion 104, the sidewall(s) 1112 may be disposed around the exterior surface 906 of the stanchion 104, and/or the second end 902 of the stanchion 104 may be at least partially disposed within the pocket 1100. In doing so, during installation of a replacement tile, for example, the cap 108 may be secured to the stanchion 104 and prevented from falling off of the stanchion 104. The passageway 500 is further shown being accessible via the passageway 1102 in the cap 108. Once the leading edge 1110 punctures the replacement tile, and produces a hole in the replacement tile, the fastener 112 may be disposed through the replacement tile, through the passageway 1200, and into the passageway 500.

In some instances, the cap 108 may be seated on the stanchion 104, or coupled to the stanchion 104, differently than shown. For example, one or more clips may engage with the struts 904 of the stanchion 104 for securing the cap 108 to the stanchion 104. In such instances, the cap 108 may or may not include the pocket 1100. Instead, for example, the cap 108 may include a flattened washer, with the passageway 1102 and the leading edge 1110, as well as the clips that extend from the cap 108 for engaging with the struts 904. In some instances, the cap 108 may include three clips that engage with the struts 904 of the stanchion 104, respectively. However, the cap 108 may include more than or less than three clips.

Figure 13A:
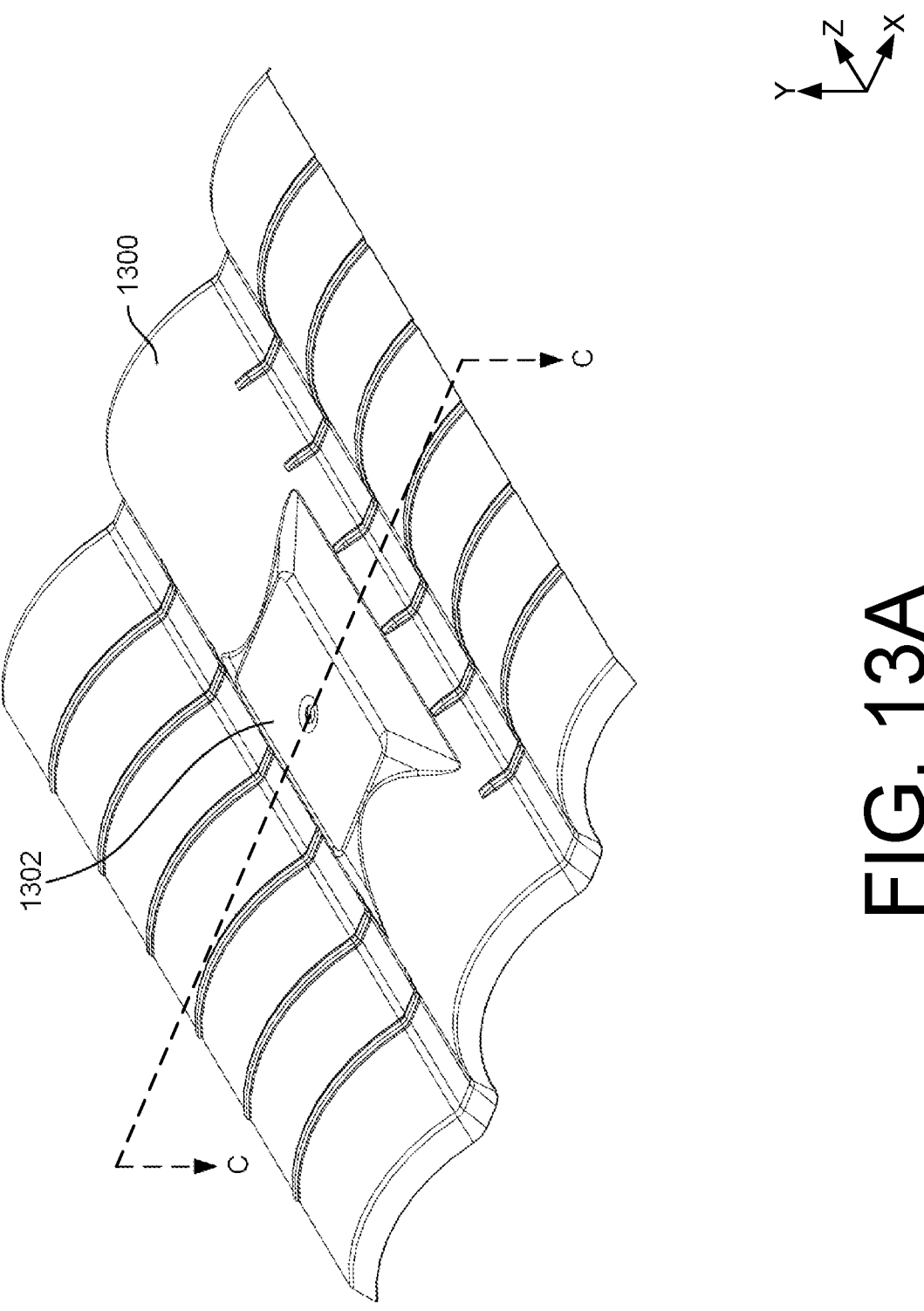
FIGS. 13A-13C illustrate an example installation of an example replacement tile using the mounting system of FIG. 1, according to embodiments of the present disclosure.
Figure 13B:
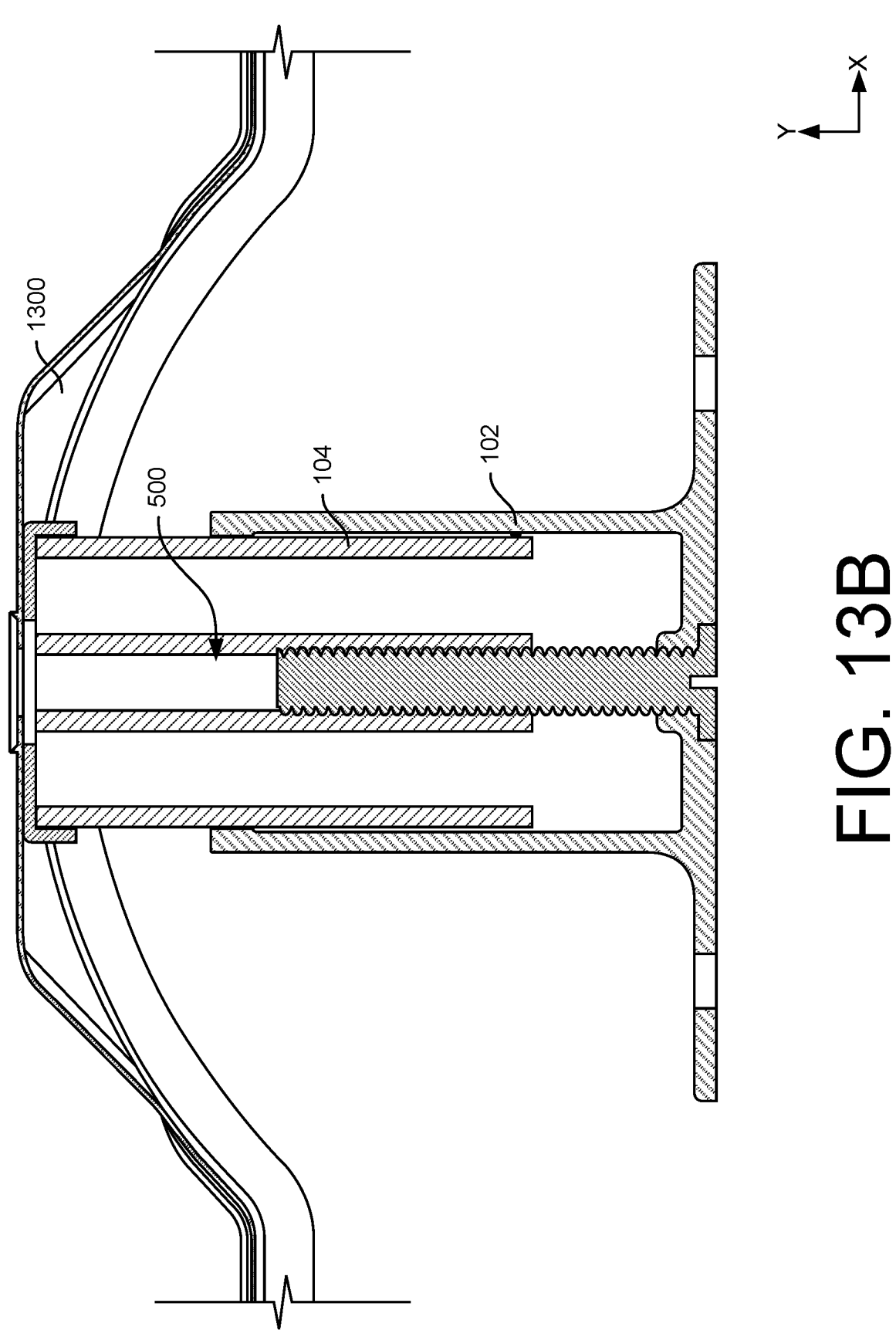
Figure 13C:
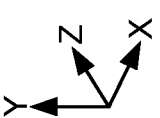

FIGS. 13A-13C illustrate a progression of installing a replacement tile 1300 onto a surface, according to embodiments of the present disclosure. Initially, the base 102 may be mounted to the surface, and the stanchion 104 may be adjusted to a proper height (e.g., in the Y-direction) such that the replacement tile 1300 aligns with other tiles on the surface. The stanchion 104 may therein be "locked" into place via the locking mechanism 106 to prevent unwanted or inadvertent movement of the stanchion 104. With the replacement tile 1300 in place, a platform 1302 of the replacement tile 1300 that resides vertically above the cap 108, may be impacted with a tool (e.g., hammer) to indent or mark the replacement tile 1300. The platform 1302, or more generally a flat region, area, etc. of the replacement tile 1300, may be different than shown. For example, the platform 1302 may be larger than shown to create a larger area under which the base 102 may be placed. This may accommodate, for example, differing placements of the base 102 on the structure while still permitting the cap 108 to punch out the replacement tile 1300.

The replacement tile 1300 may then be removed and a hole may be drilled through the replacement tile 1300 at location corresponding to the mark. However, in some instances, rather than drilling a hole in the replacement tile 1300, a hole in the replacement tile 1300 may be punched out via the leading edge 1110. In FIG. 13B, which illustrates a cross-sectional view of the replacement tile 1300 and portions of the mounting system 100 taken along line C-C of FIG. 13A, the hole drilled through the replacement tile 1300 may align (e.g., concentric) with the passageway 500 of the stanchion 104. As shown in FIG. 13C, the fastener 112 may be threaded into the passageway 500 to secure the bracket 110 and the replacement tile 1300. The fastener 112 may also be disposed through the passageway 1102 in the cap 108. Accordingly, the base 102, the stanchion 104, the locking mechanism 106, and the cap 108 may be disposed vertically beneath the replacement tile 1300, while the bracket 110 may be disposed vertically above the replacement tile 1300.

In an embodiment, seals, gaskets, and the like may be used to seal around the opening in the replacement tile 1300 to prevent liquid or other debris leaking onto the structure. For example, a grommet may be disposed around the fastener 112 to prevent the ingress of liquid (e.g., snow melt, rain, etc.). Additionally, after installation, and although not shown, frames or other mounting equipment of the photovoltaic modules may be coupled to the bracket 110 via the slot 122.

Although a certain orientation of the base 102 and/or bracket 110 is shown in FIGS. 13A-13C, the base 102 and/or the bracket 110 may be oriented differently than shown. For example, the base 102 and/or the bracket 110 may be rotated to different positions about the Y-axis (e.g., 90 degrees clockwise or counterclockwise). Rotating the base 102, for example, may permit holes in the base 102 to align with the structure, and/or rotating the bracket 110, for example, may permit addition frames, etc. to mount to the bracket 110.

Figure 14A:
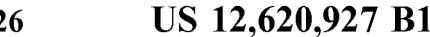
FIGS. 14A-14C illustrate an example installation of an example replacement tile using the mounting system of FIG. 1, according to embodiments of the present disclosure.
Figure 14B:
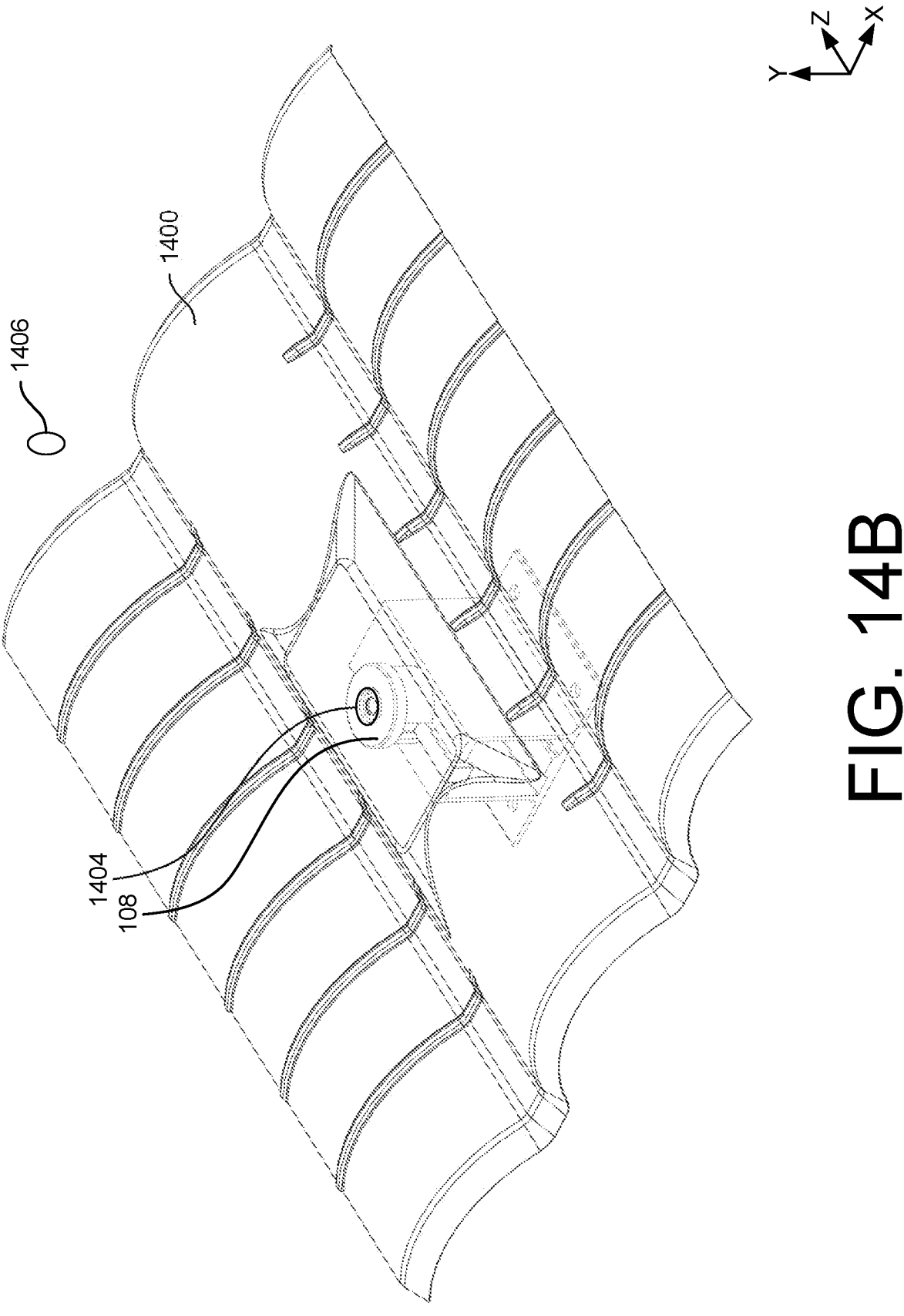
Figure 14C:
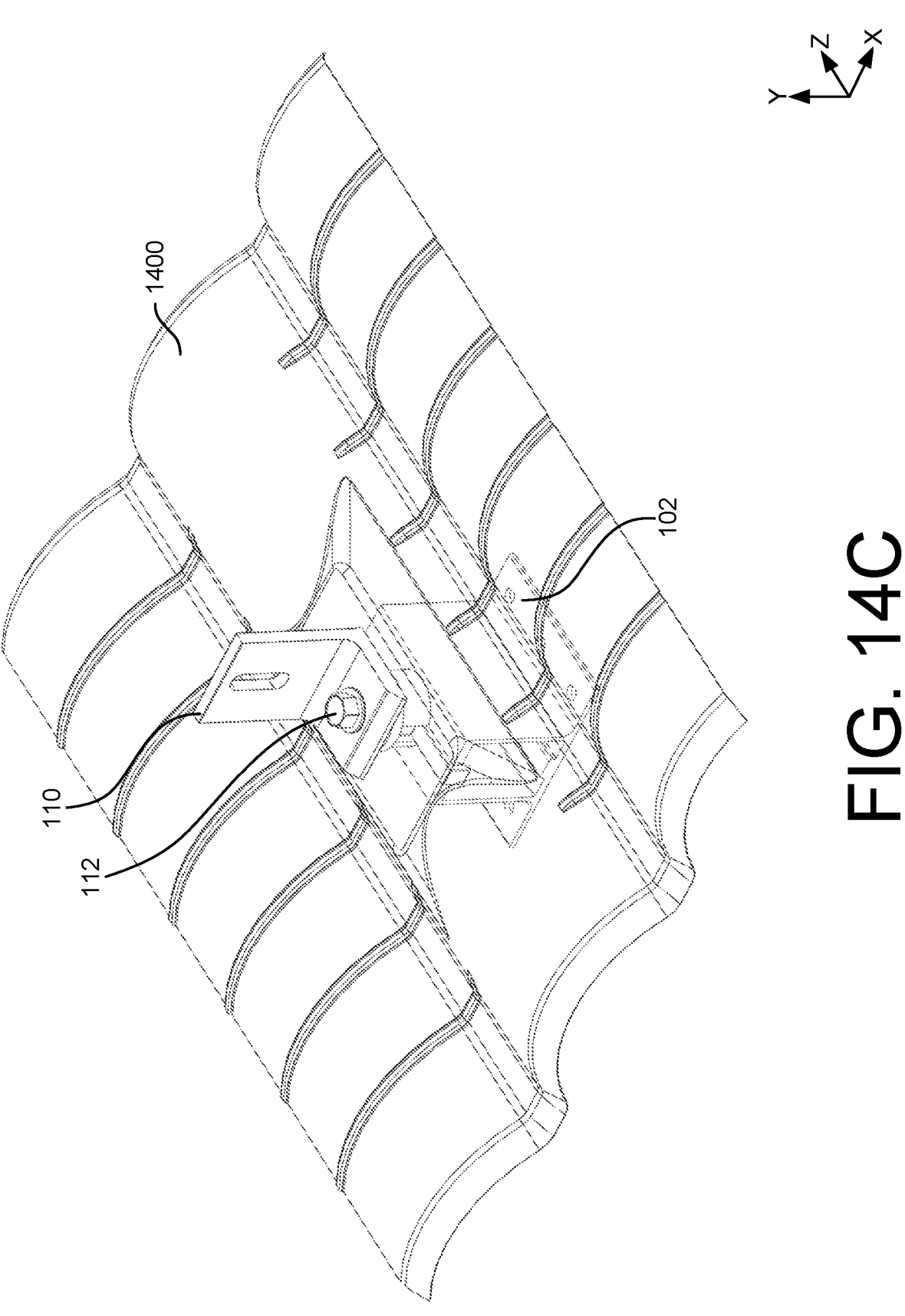

FIGS. 14A-14C illustrate a progression of installing a replacement tile 1400 onto a surface, according to embodiments of the present disclosure. Compared to installation of the replacement tile 1300 as discussed above with regard to FIGS. 13A-13C, FIGS. 14A-14C illustrate the replacement tile 1400 being installed by punching a hole through the replacement tile 1400 via the leading edge 1110.

Initially, and beginning with FIG. 14A, the base 102 may be mounted to a surface, and the stanchion 104 may be adjusted to a proper height (e.g., in the Y-direction) such that the replacement tile 1400 aligns with other tiles on the surface. The stanchion 104 may therein be "locked" into place via the locking mechanism 106 to prevent unwanted or inadvertent movement of the stanchion 104. With the base 102 being secured in place, the replacement tile 1400 may be disposed vertically above the stanchion 104. The cap 108 is disposed on the second end 902 of the stanchion 104 in order to punch through the replacement tile 1400. In an embodiment, a platform 1402 of the replacement tile 1400 may be disposed vertically above cap 108. The platform 1402 may be substantially planar in shape.

In FIG. 14B, the leading edge 1110 may puncture or pierce through a portion of the replacement tile 1400, thereby creating a hole 1404. The hole 1404 may be sized to receive the fastener 112 for securing the bracket 110 to the stanchion 104, and the hole 1404 may be aligned with the passageway 500. Moreover, during piercing of the replacement tile 1400, a fragment 1406 (e.g., punch out) may be generated. As such, when an installer places the replacement tile 1400 on top of the stanchion 104, and using a mallet, impacts on the replacement tile 1400 at a location adjacent to where the stanchion 104 is located, a hole 1404 is punched in the replacement tile 1400 exactly where it is needed.

In an embodiment, the fragment 1406 may remain at least partially connected to the replacement tile 1400 (e.g., along a side, etc.), or the fragment 1406 may be completely sheared off from the replacement tile 1400. In the former scenario, if the fragment 1406 remains connected to the replacement tile 1400, an installer may twist, bend, or otherwise manipulate the fragment 1406 to sever the fragment 1406 from the replacement tile 1400. In an embodiment, the hole 1404 may be circular shaped, however, other shapes are envisioned (e.g., square, hexagonal, ovular, etc.).

The platform 1402, or more generally a flat region, area, etc. of the replacement tile 1400, may be different than shown. For example, the platform 1402 may be larger than shown to create a larger area under which the base 102 may be placed. This may accommodate, for example, differing placements of the base 102 on the structure while still permitting the cap 108 to punch out the fragment 1406 from the replacement tile 1400.

In FIG. 14C, the fastener 112 may be disposed through the hole 1404 and threaded into the passageway 500 to secure the bracket 110 and the replacement tile 1400 to the base 102. The fastener 112 may also be disposed through the passageway 1102 in the cap 108. Accordingly, the base 102, the stanchion 104, the locking mechanism 106, and the cap 108 may be disposed vertically beneath the replacement tile 1400, while the bracket 110 may be disposed vertically above the replacement tile 1400. In an embodiment, seals, gaskets, and the like may be used to seal around the hole 1404 in the replacement tile 1400 to prevent the ingress of liquid (e.g., snow melt, rain, etc.).

Although a certain orientation of the base 102 and/or bracket 110 is shown in FIGS. 14A-14C, the base 102 and/or the bracket 110 may be oriented differently than shown. For example, the base 102 and/or the bracket 110 may be rotated to different positions about the Y-axis (e.g., 90 degrees clockwise or counterclockwise). Rotating the base 102, for example, may permit holes in the base 102 to align with the structure, and/or rotating the bracket 110, for example, may permit addition frames, etc. to mount to the bracket 110.

Figure 15:
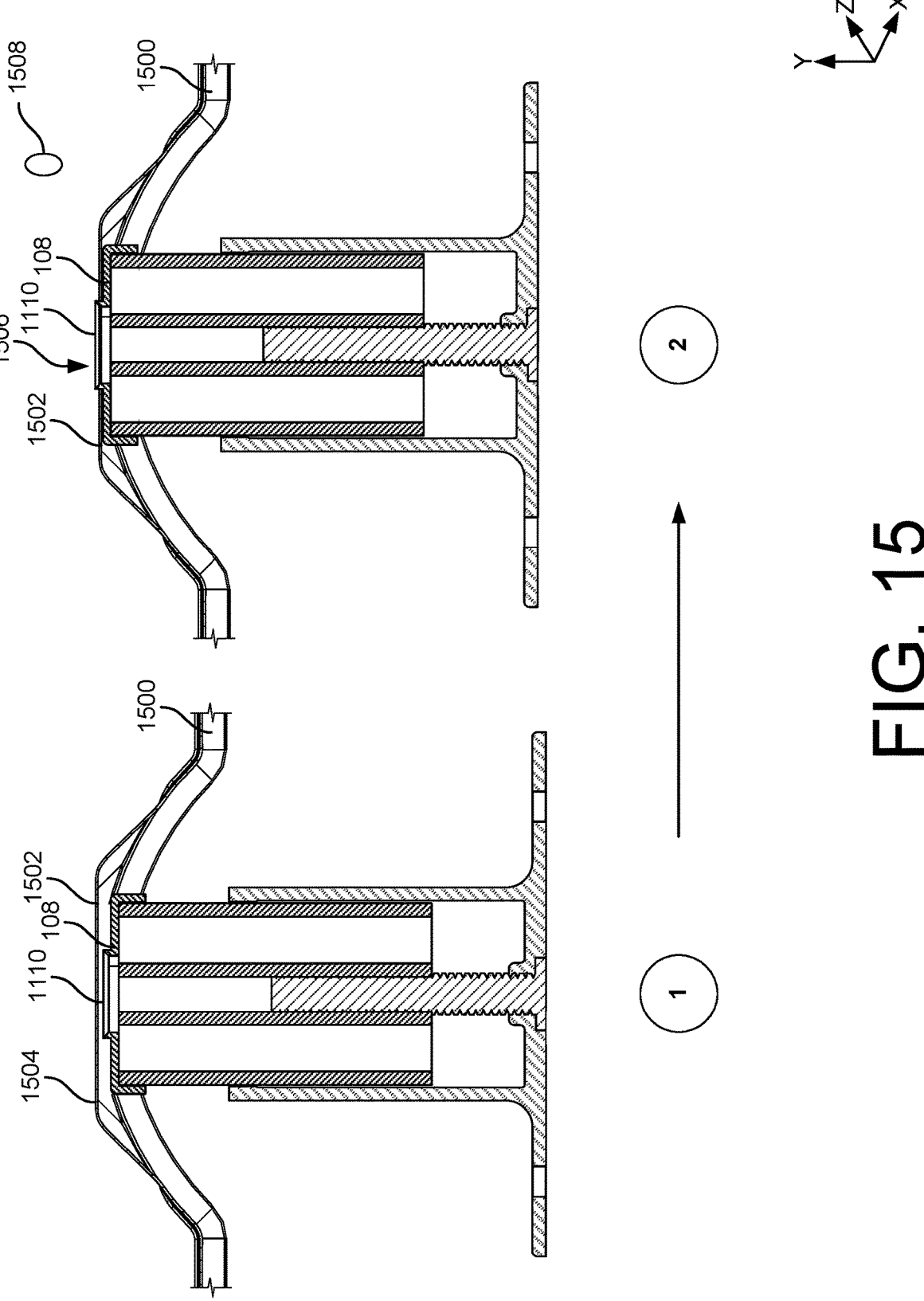
FIG. 15 illustrates an example use of the cap of FIGS. 11A and 11B to pierce an example replacement tile, according to embodiments of the present disclosure.

FIG. 15 illustrates a puncturing of a replacement tile 1500, according to embodiments of the present disclosure. The replacement tile 1500 may be representative of the replacement tile 1300 and/or the replacement tile 1400. Regardless of the specific embodiment, the replacement tile 1500 may have a bottom surface 1502 that is impacted by the leading edge 1110 of the cap 108 to pierce a portion of the replacement tile 1500. For example, at "1" in FIG. 15, the leading edge 1110 may be disposed adjacent to the bottom surface 1502. Upon impact, for example, on a top surface 1504 of the replacement tile, a hole 1506 may be punched through the replacement tile 1500. The impact on the top surface 1504 may be adjacent to the cap 108, or the leading edge 1110, or order to pierce through the replacement tile 1500. Accordingly, at "2" in FIG. 15, the replacement tile 1500 may be pierced, thereby generated a fragment 1508 that represents a portion of the replacement tile 1500 punched out. In doing so, the leading edge 1110 (or a portion of the collar 1108) may be disposed through the hole 1506. Additionally, once punched through, the top 1104 of the cap 108 (or a top surface thereof) may be disposed against the bottom surface 1502.

Figure 16A:
FIGS. 16A-16C illustrate an example use of the mounting system of FIG. 1, according to embodiments of the present disclosure.
Figure 16B:
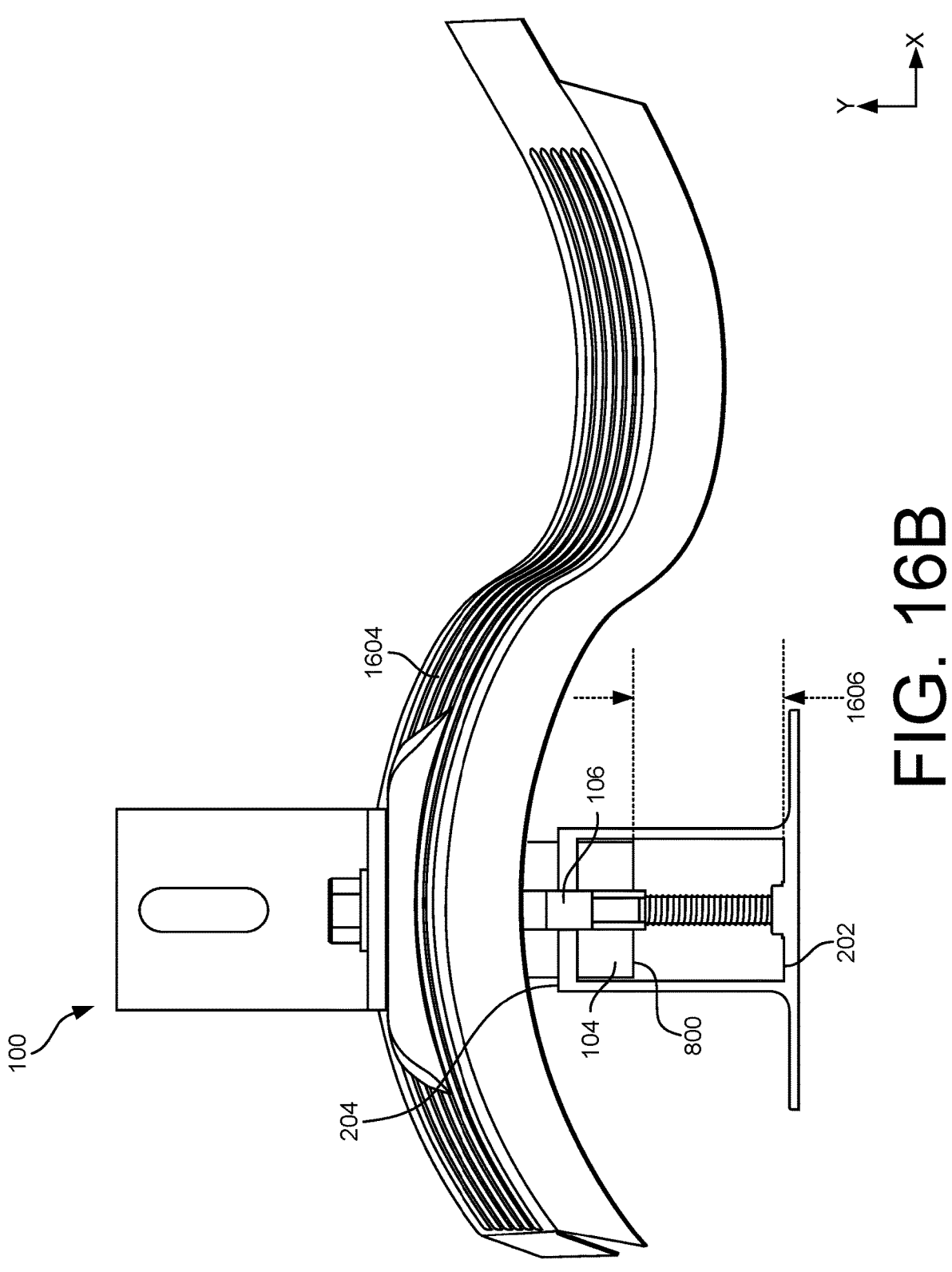
Figure 16C:
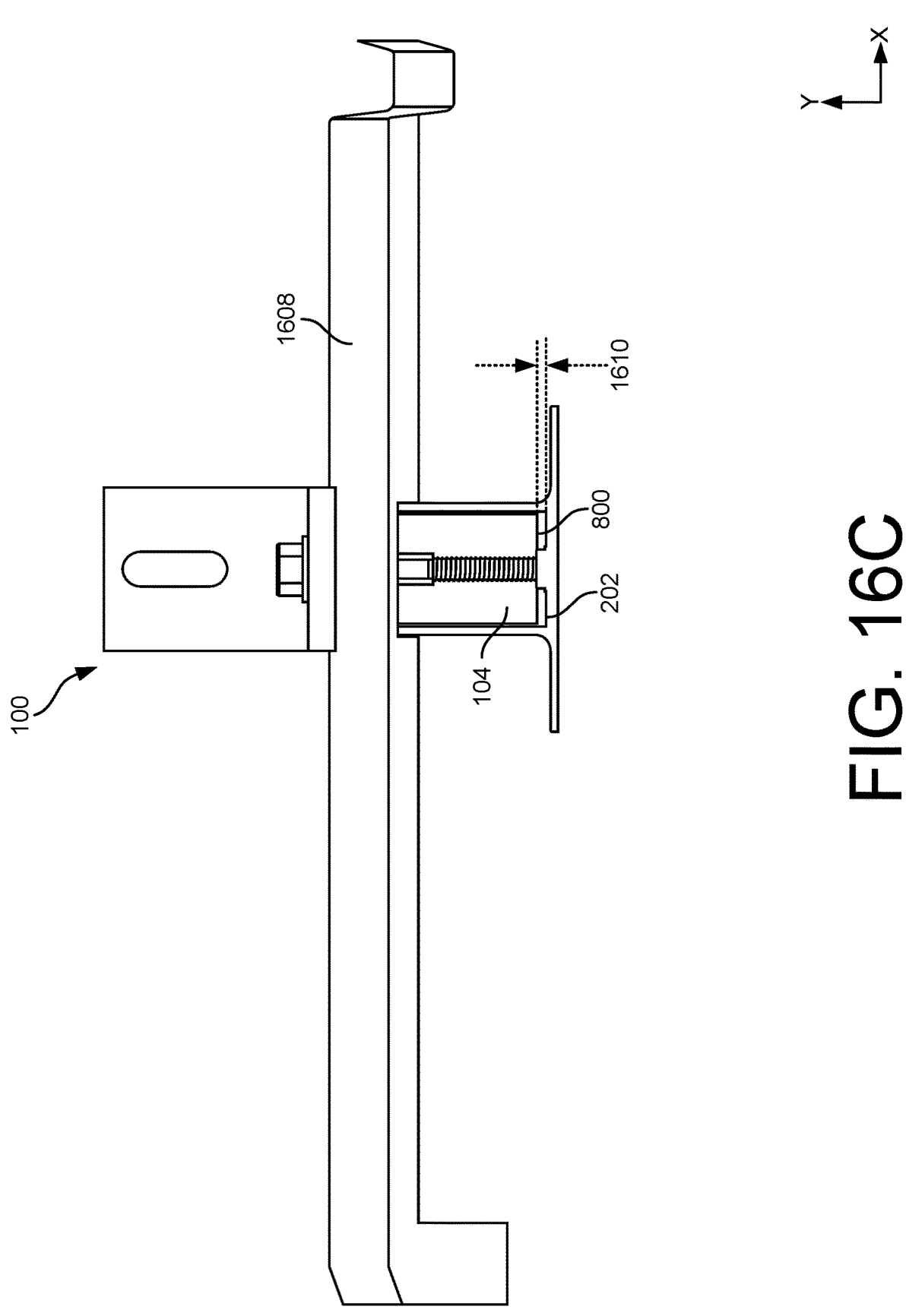

FIGS. 16A-16C illustrate an example use of the mounting system 100, according to embodiments of the present disclosure. More particularly, FIGS. 16A-16C illustrate the stanchion 104 being disposed at different heights to accommodate different replacement tiles.

In FIG. 16A, the mounting system 100 is shown being used with a first replacement tile 1600. The stanchion 104 may be raised to height in which the first replacement tile 1600 aligns with other tiles on a roof, and then locked into place via the locking mechanism 106. The stanchion 104, at this height, may be spaced apart from the bottom 202 of the base 102 by a first distance 1602 (e.g., between the first end 900 of the stanchion 104 and the bottom 202). The second end 902 of the stanchion 104 may also be spaced apart from the top surface 204 by another distance.

In FIG. 16B, the mounting system 100 is shown being used with a second replacement tile 1604. The stanchion 104 may be raised to height in which the second replacement tile 1604 aligns with other tiles on a roof, and then locked into place via the locking mechanism 106. The stanchion 104, at this height, may be spaced apart from the bottom 202 of the base 102 by a second distance 1606 (e.g., between the first end 900 of the stanchion 104 and the bottom 202). As shown, the second distance 1606 may be greater than the first distance 1602. Additionally, the second end 902 of the stanchion 104 may also be spaced apart from the top surface 204 by a distance that is greater than the example in FIG. 16A.

In FIG. 16C, the mounting system 100 is shown being used with a third replacement tile 1608. The stanchion 104 may be raised to height in which the third replacement tile 1608 aligns with other tiles on a roof, and then locked into place via the locking mechanism 106. The stanchion 104, at this height, may be spaced apart from the bottom 202 of the base 102 by a third distance 1610 (e.g., between the first end 900 of the stanchion 104 and the bottom 202). As shown, the third distance 1610 may be less than the first distance 1602 and/or the second distance 1606. Additionally, the second end 902 of the stanchion 104 may also be spaced apart from the top surface 204 by a distance that is less than the example in FIGS. 16A and 16B.

Accordingly, in FIGS. 16A-16C, the stanchion 104 may be raised and lowered to different heights to accommodate different replacement tiles. As also shown in FIGS. 16A-16C, the stanchion 104 may engage with the first sidewall 206 and/or the third sidewall 210 to provide lateral support the stanchion 104 in order to prevent twisting, bending, etc. of the stanchion 104 and/or the post 200. However, in an embodiment, the amount of the stanchion 104 in contact with the first sidewall 206 and the third sidewall 210 may be based on an amount of the stanchion 104 in the channel 118.

In an embodiment, the stanchion 104 used with the first replacement tile 1600, the second replacement tile 1604, and/or the third replacement tile 1608 may be the same (e.g., a universal stanchion), or the stanchion 104 may be different. For example, to increase a lateral support of the stanchion 104 within the channel 118, differently sized stanchions may be used. For example, the stanchion 104 used with the first replacement tile 1600 may be shorter in length (e.g., Y-direction) than the stanchion 104 used with the second replacement tile 1604, and/or longer in length than the stanchion 104 used with the third replacement tile 1608. Additionally, replacement tiles other than the first replacement tile 1600, the second replacement tile 1604, and/or the third replacement tile 1608 may be used. In some instances, the first replacement tile 1600, the second replacement tile 1604, and/or the third replacement tile 1608 may be similar to or different than the replacement tile 1300, the replacement tile 1400, and/or the replacement tile 1500 described above. In some instances, the first replacement tile 1600, the second replacement tile 1604, and/or the third replacement tile 1608 may not include the hole.

FIG. 17 illustrates an example process 1700 for installing a replacement tile, or flashing, according to examples of the present disclosure.

At 1702, the process 1700 may include aligning a base of a mounting system on a surface. For example, the base may be aligned with sheathing, studs, etc. of a roof. In an embodiment, the base may be aligned such that one or more holes of the base are not aligned (e.g., spaced apart from) seams in the sheathing. Additionally, or alternatively, the base may be aligned such that the one or more holes are disposed above studs of a structure.

At 1704, the process 1700 may include securing the base into the surface. For example, fasteners may be disposed through the one or more holes in the base to secure the base to the surface. In an embodiment, fasteners may be disposed through more than one hole of the one or more holes, respectively, for securing the base to the surface. Further, sealants (e.g., caulk, weather stripping, etc.) may be used to prevent an ingress of liquid into the surface (e.g., created via the fasteners).

At 1706, the process 1700 may include aligning a replacement tile adjacent to a piercing mechanism of the mounting system. For example, the piercing mechanism may represent a leading or cutting edge of a cap disposed on a stanchion of the mounting system. In an embodiment, prior to aligning the replacement tile (or other flashing), the stanchion may be adjusted to a proper height such that the replacement tile, once installed, aligns with other tiles on the surface. Once raised to the desired height, for example, the stanchion may be "locked" into place via a locking mechanism of the mounting system to prevent unwanted or inadvertent movement of the stanchion. In an embodiment, a portion (e.g., planar region) of the replacement tile may be aligned or disposed adjacent to the piercing mechanism.

At 1708, the process 1700 may include impacting a surface of the replacement tile to cause the piercing mechanism to pierce through the replacement tile. For example, within the replacement tile aligned, an installer may impact the replacement tile using a mallet, hammer, etc. The installer may impact a top surface of the replacement tile, opposite a bottom surface in which the piercing mechanism contacts the replacement tile. By striking the replacement tile, the piercing mechanism may pierce through the replacement tile. In an embodiment, the piercing mechanism generates a fragment that is severed from the replacement tile, or the fragment may remain at least partially connected and thereafter removed via the installer (e.g., via pliers, for example).

At 1710, the process 1700 may include disposing a fastener through a hole created via the piercing mechanism piercing through the replacement tile. For example, once the hole in the replacement tile is created, the installer may secure a bracket to the base (or the stanchion) via disposing the fastener through the hole in the replacement tile and into the stanchion. Here, seals (e.g., O-rings, washers, etc.) may be used to prevent an ingress of liquid through the hole in the replacement tile.

At 1712, the process 1700 may include fastening the fastener to couple the replacement tile to the mounting system. For example, via tightening the fastener into the stanchion, the replacement tile may become secured between the bracket and the stanchion. Thereafter, photovoltaic modules, rails, etc. may be secured to the bracket.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A mounting system for coupling a replacement tile and a photovoltaic module to a structure, the mounting system comprising:
   a base including a receptacle and a channel, the base configured to be disposed adjacent to a bottom side of the replacement tile;
   a post coupled to the base and extending at least partially into the channel;
   a stanchion rotatably coupled to the post and being received at least partially within the receptacle, the stanchion including a groove;
   a locking mechanism coupled to the base and configured to prevent rotation of the stanchion, the locking mechanism including:
      a first arm configured to at least partially engage with the groove,
      a second arm extending from the first arm,
      a third arm extending from the second arm,
      a tab extending from the first arm, wherein the tab is configured to be at least partially disposed within the channel, and
      a flange disposed on or extending from the third arm, wherein the flange is configured to engage with an interior surface of the channel; and
   a bracket coupled to the stanchion, the bracket configured to be disposed adjacent to a top side of the replacement tile, opposite the bottom side, the bracket configured to support the photovoltaic module.

2. The mounting system of claim 1, further comprising:
   a cap including an opening; and
   a fastener configured to be disposed through the opening and the replacement tile into the stanchion.

3. The mounting system of claim 2, wherein:
   the stanchion includes:
      a first end configured to couple to the post, and
      a second end configured to receive the fastener; and
   the groove extends between the first end and the second end.

4. The mounting system of claim 2, wherein the cap further includes a collar having a leading edge configured to pierce the replacement tile.

5. A mounting system comprising:
   a base configured to be disposed beneath a replacement tile, the base including:
      a bottom,
      a first sidewall that extends from the bottom,
      a second sidewall adjoined to the first sidewall,
      a third sidewall that extends from the bottom and adjoined to the second sidewall, the third sidewall having:
         a receptacle, and
         an opening connected to the receptacle, and
      a channel defined at least in part by the bottom, the first sidewall, the second sidewall, and the third sidewall;
   a post coupled to the base;
   a stanchion configured to be at least partially disposed (i) through the receptacle and (ii) within the channel, the stanchion including a passageway that rotatably couples about the post;
   a locking mechanism engageable with the stanchion to prevent rotation of the stanchion, wherein at least a portion of the locking mechanism is insertable through the receptacle and the opening of the third sidewall;
   a cap including an opening;
   a bracket configured to be disposed above the replacement tile; and
   a fastener configured to be disposed through the opening of the cap, the bracket, and into the passageway to secure the bracket to the stanchion.

6. The mounting system of claim 5, wherein:
   the stanchion includes a first end that receives the post and a second end, opposite the first end, that receives the fastener; and
   the passageway extends between the first end and the second end.

7. The mounting system of claim 5, wherein:
   the stanchion includes a groove; and
   the locking mechanism is at least partially received within the groove.

8. The mounting system of claim 5, wherein:
   the third sidewall includes:
      a first surface,
      a second surface opposite the first surface, and
      a third surface; and
   the locking mechanism includes:
      a first arm having a tab configured to engage with the first surface or the third surface,
      a second arm configured to reside adjacent to the second surface, and
      a third arm having a flange configured to engage with the first surface.

9. The mounting system of claim 5, wherein the cap includes an edge disposed around the opening, the edge being configured to form an aperture through a replacement tile mounted to the stanchion via the fastener.

10. A system comprising:

a base including a channel;

a post coupled to the base and extending at least partially into the channel;

a stanchion configured to extend above the base via rotation about the post, the stanchion including a groove;

a locking mechanism configured to prevent rotation of the stanchion, the locking mechanism including:

a first arm disposable at least partially within the groove, a second arm extending from the first arm, a third arm extending from the second arm, and a tab configured to engage with a surface of the base;

a cap;

a bracket; and a fastener configured to couple the cap and the bracket to the stanchion.

11. The system of claim 10, wherein:

the stanchion includes a passageway having a first end and a second end;

the first end receives the post; and the second end receives the fastener.

12. The system of claim 10, wherein:

the base includes a receptacle; and the stanchion is insertable into the channel via the receptacle.

13. The system of claim 10, further comprising a tile, wherein the cap further includes an opening and an edge disposed around the opening, the edge being configured to deform a portion of the tile corresponding to a location at which the fastener couples to the stanchion.

14. The mounting system of claim 5, wherein the post, the locking mechanism, and the cap are disposable beneath the replacement tile.

15. The mounting system of claim 1, wherein the tab is deflectable relative to the first arm.

16. The mounting system of claim 2, wherein the cap includes a pocket disposable on an end of the stanchion.

17. The mounting system of claim 5, wherein the cap is disposed beneath the replacement tile.

18. The mounting system of claim 5, wherein:

the base includes apertures disposed through the bottom; and the apertures are disposed external to the channel.

19. The system of claim 10, wherein the tab extends from or is disposed on an end of the third arm.

20. The system of claim 10, wherein:

a first portion of the first arm is disposable internal to the channel; and a second portion of the second arm is disposable external to the channel.

* * * * *